(12) United States Patent
Hatfield et al.

(10) Patent No.: US 9,475,004 B2
(45) Date of Patent: Oct. 25, 2016

(54) RHODIUM-IRON CATALYSTS

(71) Applicant: Clean Diesel Technologies, Inc., Oxnard, CA (US)

(72) Inventors: Randal L. Hatfield, Port Hueneme, CA (US); Stephen J. Golden, Santa Barbara, CA (US); Johnny T. Ngo, Oxnard, CA (US)

(73) Assignee: Clean Diesel Technologies, inc., Oxnard, CA (US)

( * ) Notice: Subject to any disclaimer, the term of this patent is extended or adjusted under 35 U.S.C. 154(b) by 0 days.

(21) Appl. No.: 14/732,307

(22) Filed: Jun. 5, 2015

(65) Prior Publication Data
US 2015/0352531 A1 Dec. 10, 2015

Related U.S. Application Data

(60) Provisional application No. 62/163,231, filed on May 18, 2015, provisional application No. 62/008,674, filed on Jun. 6, 2014.

(51) Int. Cl.
*B01J 27/25* (2006.01)
*B01J 23/00* (2006.01)
(Continued)

(52) U.S. Cl.
CPC ......... *B01D 53/9472* (2013.01); *B01D 53/945* (2013.01); *B01D 53/9454* (2013.01); *B01J 21/04* (2013.01); *B01J 23/002* (2013.01);
(Continued)

(58) Field of Classification Search
CPC ...... B01J 21/066; B01J 23/10; B01J 23/464; B01J 23/8906; B01J 23/894

USPC ........ 502/302–304, 326–327, 336, 338, 349, 502/355, 439, 527.12, 527.13
See application file for complete search history.

(56) References Cited

U.S. PATENT DOCUMENTS

| | | | |
|---|---|---|---|
| 4,283,308 | A | 8/1981 | Ohara et al. |
| 4,426,319 | A | 1/1984 | Blanchard et al. |

(Continued)

FOREIGN PATENT DOCUMENTS

| | | |
|---|---|---|
| DE | 29 28 249 | 1/1980 |
| EP | 2 308 595 | 4/2011 |

(Continued)

OTHER PUBLICATIONS

Hayes et al., "Introduction to Catalytic Combustion", pp. 310-313, 1997 OPA (Overseas Publishers Association).
(Continued)

*Primary Examiner* — Cam N. Nguyen
(74) *Attorney, Agent, or Firm* — Alston & Bird LLP

(57) ABSTRACT

The present disclosure describes rhodium iron catalysts of use in catalyst systems. Disclosed here are TWCs configured to include a substrate and one or more of a washcoat layer, an impregnation layer, and/or an overcoat layer. Disclosed herein are one or more of a washcoat layer and/or an overcoat layer formed using a slurry that includes one or more of an oxygen storage material, a refractory support oxide, iron, and rhodium. Disclosed herein are methods of preparing catalysts wherein a washcoat layer is deposited onto the substrate, one or more impregnation layers may be deposited onto the washcoat layer, one or more overcoat layers may be deposited onto the impregnation washcoat layer, and one or more additional impregnation layers may be deposited onto the one or more washcoat layers.

20 Claims, 15 Drawing Sheets

100

(51) Int. Cl.

| | | |
|---|---|---|
| *B01J 23/02* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 23/58* | (2006.01) | |
| *B01J 23/70* | (2006.01) | |
| *B01J 23/74* | (2006.01) | |
| *B01J 21/04* | (2006.01) | |
| *B01D 53/94* | (2006.01) | |
| *B01J 23/89* | (2006.01) | |
| *B01J 35/04* | (2006.01) | |
| *B01J 23/20* | (2006.01) | |
| *B01J 23/63* | (2006.01) | |
| *B01J 27/232* | (2006.01) | |
| *B01J 35/00* | (2006.01) | |

(52) U.S. Cl.
CPC .............. *B01J 23/10* (2013.01); *B01J 23/20* (2013.01); *B01J 23/63* (2013.01); *B01J 23/894* (2013.01); *B01J 23/8906* (2013.01); *B01J 27/232* (2013.01); *B01J 35/0006* (2013.01); *B01J 35/04* (2013.01); *B01D 2255/1023* (2013.01); *B01D 2255/1025* (2013.01); *B01D 2255/207* (2013.01); *B01D 2255/209* (2013.01); *B01D 2255/2042* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/2092* (2013.01); *B01D 2255/20715* (2013.01); *B01D 2255/20738* (2013.01); *B01D 2255/40* (2013.01); *B01D 2255/902* (2013.01); *B01D 2255/908* (2013.01); *B01J 2523/00* (2013.01); *Y02T 10/22* (2013.01)

(56) References Cited

U.S. PATENT DOCUMENTS

| | | | |
|---|---|---|---|
| 4,629,472 A | 12/1986 | Haney, III et al. | |
| 4,868,148 A | 9/1989 | Henk et al. | |
| 4,891,050 A | 1/1990 | Bowers et al. | |
| 4,892,562 A | 1/1990 | Bowers et al. | |
| 4,923,842 A | 5/1990 | Summers | |
| 5,024,824 A * | 6/1991 | Henk .................. | B01D 53/945 423/213.5 |
| 5,034,020 A | 7/1991 | Epperly et al. | |
| 5,168,836 A | 12/1992 | Kraus | |
| 5,203,166 A | 4/1993 | Miller | |
| 5,266,083 A | 11/1993 | Peter-Hoblyn et al. | |
| 5,404,841 A | 4/1995 | Valentine | |
| 5,501,714 A | 3/1996 | Valentine et al. | |
| 5,535,708 A | 7/1996 | Valentine | |
| 5,584,894 A | 12/1996 | Peter-Hoblyn et al. | |
| 5,693,106 A | 12/1997 | Peter-Hoblyn et al. | |
| 5,732,548 A | 3/1998 | Peter-Hoblyn et al. | |
| 5,743,922 A | 4/1998 | Peter-Hoblyn et al. | |
| 5,749,928 A | 5/1998 | Epperly et al. | |
| 5,809,774 A | 9/1998 | Peter-Hoblyn et al. | |
| 5,809,775 A | 9/1998 | Tarabulski et al. | |
| 5,819,529 A | 10/1998 | Peter-Hoblyn | |
| 5,868,421 A | 2/1999 | Eyrainer | |
| 5,921,080 A | 7/1999 | Ulmet et al. | |
| 5,924,280 A | 7/1999 | Tarabulski | |
| 5,939,354 A | 8/1999 | Golden | |
| 5,968,464 A | 10/1999 | Peter-Hoblyn et al. | |
| 5,976,475 A | 11/1999 | Peter-Hoblyn et al. | |
| 5,977,017 A | 11/1999 | Golden | |
| 6,003,303 A | 12/1999 | Peter-Hoblyn et al. | |
| 6,023,928 A | 2/2000 | Peter-Hoblyn et al. | |
| 6,051,040 A | 4/2000 | Peter-Hoblyn et al. | |
| 6,063,350 A | 5/2000 | Tarabulski et al. | |
| 6,124,130 A | 9/2000 | Olson | |
| 6,203,770 B1 | 3/2001 | Peter-Hoblyn et al. | |
| 6,279,603 B1 | 8/2001 | Czarnik et al. | |
| 6,352,955 B1 | 3/2002 | Golden | |
| 6,361,754 B1 | 3/2002 | Peter-Hoblyn et al. | |
| 6,372,686 B1 | 4/2002 | Golden | |
| 6,531,425 B2 | 3/2003 | Golden | |
| 6,948,926 B2 | 9/2005 | Valentine et al. | |
| 7,014,825 B2 | 3/2006 | Golden | |
| 7,473,288 B2 | 1/2009 | Toyoda et al. | |
| 7,527,776 B2 | 5/2009 | Golden et al. | |
| 7,641,875 B1 | 1/2010 | Golden | |
| 7,749,472 B2 * | 7/2010 | Chen .................. | B01D 53/945 423/213.2 |
| 8,105,561 B2 * | 1/2012 | Hatanaka ............ | B01D 53/945 422/111 |
| 8,323,601 B2 | 12/2012 | Justice et al. | |
| 8,545,780 B1 | 10/2013 | Chen et al. | |
| 8,569,198 B2 | 10/2013 | Hoshino et al. | |
| RE45,083 E | 8/2014 | Kuno | |
| 8,802,582 B2 | 8/2014 | Malyala et al. | |
| 8,845,987 B1 | 9/2014 | Nazarpoor et al. | |
| 8,853,121 B1 | 10/2014 | Nazarpoor et al. | |
| 8,858,903 B2 * | 10/2014 | Nazarpoor ........... | B01D 53/944 423/213.2 |
| 8,906,330 B2 | 12/2014 | Hilgendorff et al. | |
| 9,011,784 B2 * | 4/2015 | Golden ................. | C01G 25/00 422/177 |
| 9,012,353 B2 * | 4/2015 | Golden ................. | F01N 3/101 502/258 |
| 9,216,410 B2 | 12/2015 | Hatfield | |
| 2001/0001354 A1 | 5/2001 | Peter-Hoblyn et al. | |
| 2002/0001554 A1 | 1/2002 | Czarnik et al. | |
| 2002/0042341 A1 | 4/2002 | Golden | |
| 2003/0109047 A1 | 6/2003 | Valentine | |
| 2003/0126789 A1 | 7/2003 | Valentine et al. | |
| 2003/0148235 A1 | 8/2003 | Valentine et al. | |
| 2003/0185722 A1 | 10/2003 | Toyoda | |
| 2003/0198582 A1 | 10/2003 | Golden | |
| 2004/0098905 A1 | 5/2004 | Valentine et al. | |
| 2004/0172876 A1 | 9/2004 | Sprague et al. | |
| 2005/0132674 A1 | 6/2005 | Toyoda et al. | |
| 2005/0160663 A1 | 7/2005 | Valentine | |
| 2005/0160724 A1 | 7/2005 | Valentine et al. | |
| 2005/0164139 A1 | 7/2005 | Valentine et al. | |
| 2005/0188605 A1 | 9/2005 | Valentine et al. | |
| 2005/0217751 A1 | 10/2005 | Valentine et al. | |
| 2006/0081922 A1 | 4/2006 | Golden | |
| 2006/0120936 A1 | 6/2006 | Alive et al. | |
| 2006/0166816 A1 | 7/2006 | Zhang et al. | |
| 2006/0228283 A1 | 10/2006 | Malyala et al. | |
| 2006/0254535 A1 | 11/2006 | Valentine et al. | |
| 2006/0260185 A1 | 11/2006 | Valentine et al. | |
| 2006/0276332 A1 | 12/2006 | Shore et al. | |
| 2007/0015656 A1 | 1/2007 | Valentine et al. | |
| 2007/0209272 A1 | 9/2007 | Valentine | |
| 2007/0283681 A1 | 12/2007 | Makkee et al. | |
| 2008/0044330 A1 * | 2/2008 | Chen .................. | B01D 53/945 423/213.5 |
| 2008/0210184 A1 | 9/2008 | Valentine et al. | |
| 2008/0219906 A1 * | 9/2008 | Chen .................. | B01D 53/945 423/213.5 |
| 2008/0226524 A1 | 9/2008 | Alive et al. | |
| 2009/0004083 A1 | 1/2009 | Valentine et al. | |
| 2009/0257933 A1 | 10/2009 | Chen et al. | |
| 2009/0304566 A1 | 12/2009 | Golden et al. | |
| 2009/0324468 A1 * | 12/2009 | Golden ................ | B01D 53/945 423/210 |
| 2009/0324469 A1 | 12/2009 | Golden et al. | |
| 2010/0124523 A1 | 5/2010 | Chen et al. | |
| 2010/0135879 A1 | 6/2010 | Roesch et al. | |
| 2010/0212293 A1 | 8/2010 | Deeba et al. | |
| 2010/0240525 A1 * | 9/2010 | Golden ................ | B01D 53/945 502/65 |
| 2010/0316545 A1 | 12/2010 | Alive et al. | |
| 2010/0316547 A1 | 12/2010 | Justice et al. | |

(56) References Cited

U.S. PATENT DOCUMENTS

| | | |
|---|---|---|
| 2011/0239626 A1 | 10/2011 | Makkee et al. |
| 2012/0088655 A1 | 4/2012 | Yabuzaki et al. |
| 2012/0128557 A1 | 5/2012 | Nunan et al. |
| 2012/0131911 A1 | 5/2012 | Nakagawa et al. |
| 2012/0183447 A1 | 7/2012 | Kwan et al. |
| 2013/0115144 A1 | 5/2013 | Golden et al. |
| 2013/0236380 A1 | 9/2013 | Golden et al. |
| 2014/0271384 A1 | 9/2014 | Nazarpoor et al. |
| 2014/0271387 A1 | 9/2014 | Nazarpoor |
| 2014/0271388 A1 | 9/2014 | Nazarpoor et al. |
| 2014/0271390 A1* | 9/2014 | Nazarpoor ........... B01D 53/945 422/177 |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0271425 A1 | 9/2014 | Nazarpoor |
| 2014/0274662 A1 | 9/2014 | Nazarpoor |
| 2014/0274663 A1 | 9/2014 | Nazarpoor |
| 2014/0274674 A1 | 9/2014 | Nazarpoor et al. |
| 2014/0274675 A1* | 9/2014 | Nazarpoor ............. B01J 23/894 502/303 |
| 2014/0274677 A1 | 9/2014 | Nazarpoor |
| 2014/0274678 A1 | 9/2014 | Nazarpoor |
| 2014/0298714 A1 | 10/2014 | Sprague |
| 2014/0301906 A1 | 10/2014 | Hatfield |
| 2014/0301909 A1 | 10/2014 | Nazarpoor |
| 2014/0301926 A1 | 10/2014 | Hatfield |
| 2014/0301931 A1 | 10/2014 | Nazarpoor |
| 2014/0302983 A1 | 10/2014 | Nazarpoor |
| 2014/0323294 A1 | 10/2014 | Nagao et al. |
| 2014/0334978 A1 | 11/2014 | Hatfield |
| 2014/0334989 A1 | 11/2014 | Nazarpoor et al. |
| 2014/0334990 A1 | 11/2014 | Nazarpoor |
| 2014/0335625 A1 | 11/2014 | Hatfield |
| 2014/0335626 A1 | 11/2014 | Hatfield |
| 2014/0336038 A1* | 11/2014 | Nazarpoor ........... B01J 23/8892 502/65 |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1* | 12/2014 | Nazarpoor ........... B01J 23/8892 502/73 |
| 2014/0357479 A1* | 12/2014 | Nazarpoor ........... B01J 23/8892 502/302 |
| 2014/0360164 A1 | 12/2014 | Sprague et al. |
| 2014/0364303 A1 | 12/2014 | Hatfield |
| 2014/0369912 A1 | 12/2014 | Zheng et al. |
| 2015/0004709 A1 | 1/2015 | Nazarpoor |
| 2015/0005157 A1 | 1/2015 | Nazarpoor et al. |
| 2015/0005158 A1 | 1/2015 | Nazarpoor |
| 2015/0005159 A1 | 1/2015 | Nazarpoor et al. |
| 2015/0017082 A1 | 1/2015 | Nazarpoor |
| 2015/0018202 A1 | 1/2015 | Nazarpoor et al. |
| 2015/0018203 A1 | 1/2015 | Nazarpoor et al. |
| 2015/0018204 A1* | 1/2015 | Nazarpoor ............... B01J 23/83 502/304 |
| 2015/0018205 A1 | 1/2015 | Nazarpoor et al. |
| 2015/0031268 A1 | 1/2015 | Waites et al. |
| 2015/0050742 A1 | 2/2015 | Nazarpoor |
| 2015/0051067 A1 | 2/2015 | Nazarpoor et al. |
| 2015/0093300 A1 | 4/2015 | Arnold et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0139883 A1 | 5/2015 | Notestein et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor et al. |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |
| 2015/0182951 A1 | 7/2015 | Nazarpoor et al. |
| 2015/0182954 A1 | 7/2015 | Nazarpoor et al. |
| 2015/0196902 A1* | 7/2015 | Golden ................. F01N 3/101 423/213.2 |
| 2015/0238940 A1 | 8/2015 | Nazarpoor et al. |
| 2015/0238941 A1 | 8/2015 | Nazarpoor et al. |
| 2015/0258496 A1 | 9/2015 | Hatfield et al. |
| 2015/0290627 A1 | 10/2015 | Nazarpoor et al. |
| 2015/0290630 A1 | 10/2015 | Nazarpoor et al. |
| 2015/0316524 A1 | 11/2015 | Hatfield |
| 2015/0352494 A1 | 12/2015 | Hatfield et al. |
| 2015/0352529 A1 | 12/2015 | Nazarpoor et al. |
| 2015/0352531 A1 | 12/2015 | Hatfield et al. |
| 2015/0352532 A1 | 12/2015 | Hatfield et al. |
| 2015/0352533 A1 | 12/2015 | Hatfield et al. |
| 2016/0023188 A1 | 1/2016 | Nazarpoor et al. |
| 2016/0030885 A1 | 2/2016 | Hatfield |
| 2016/0047751 A1 | 2/2016 | Pless et al. |
| 2016/0082422 A1 | 3/2016 | Nazarpoor et al. |
| 2016/0121304 A1 | 5/2016 | Nazarpoor et al. |
| 2016/0121308 A1 | 5/2016 | Nazarpoor et al. |
| 2016/0121309 A1 | 5/2016 | Nazarpoor et al. |
| 2016/0136617 A1 | 5/2016 | Nazarpoor et al. |
| 2016/0136618 A1 | 5/2016 | Nazarpoor et al. |
| 2016/0136619 A1 | 5/2016 | Nazarpoor et al. |
| 2016/0136620 A1 | 5/2016 | Nazarpoor et al. |
| 2016/0136621 A1 | 5/2016 | Nazarpoor et al. |

FOREIGN PATENT DOCUMENTS

| | | |
|---|---|---|
| WO | WO 90/07561 | 7/1990 |
| WO | WO 94/11467 | 5/1994 |
| WO | WO 95/02655 | 1/1995 |
| WO | WO 97/04045 | 2/1997 |
| WO | WO 97/09523 | 3/1997 |
| WO | WO 97/28358 | 8/1997 |
| WO | WO 97/36676 | 10/1997 |
| WO | WO 98/22209 A1 | 5/1998 |
| WO | WO 98/28070 A1 | 7/1998 |
| WO | WO 00/30739 A1 | 6/2000 |
| WO | WO 00/75643 A1 | 12/2000 |
| WO | WO 01/085876 A1 | 11/2001 |
| WO | WO 03/068363 A1 | 8/2003 |
| WO | WO 2004/058641 A1 | 7/2004 |
| WO | WO 2009/139860 A1 | 11/2009 |
| WO | WO 2011/068509 A1 | 6/2011 |
| WO | WO 2014/194101 A1 | 12/2014 |
| WO | WO 2015/199687 A1 | 12/2015 |
| WO | WO 2015/199688 A1 | 12/2015 |
| WO | WO 2016/039747 A1 | 3/2016 |

OTHER PUBLICATIONS

International Search Report and Written Opinion for corresponding International Application No. PCT/US2015/034538, dated Aug. 26, 2015.

International Search Report and Written Opinion for corresponding International Application No. PCT/IB2016/052877, dated Jul. 26, 2016.

* cited by examiner

RHODIUM-IRON CATALYSTS

CROSS-REFERENCE TO RELATED APPLICATIONS

The present invention claims the benefit of U.S. Provisional Patent Application Ser. No. 62/008,674, filed Jun. 6, 2014, titled "Rhodium-Iron Catalysts", and U.S. Provisional Patent Application Ser. No. 62/163,231, filed May 18, 2015, titled "Systems and Apparatuses for Rhodium-Iron Catalysts", the entireties of which are incorporated by reference herein.

BACKGROUND

1. Field of the Disclosure

The present disclosure relates in general to materials used in three-way catalytic (TWC) converters, and more specifically, to catalysts including rhodium.

2. Background Information

Current automotive catalysts largely depend on platinum group metals (e.g., Platinum, Palladium, and Rhodium) in order to convert vehicle emissions to less noxious substances. However, the supply of said metals is limited even as automobile production increases as a larger portion of the world population adopts motorized vehicles for transport. Additionally, environmental concerns have led to ever more stringent NOx, hydrocarbon, and particulate emission regulations being adopted in countries throughout the world. As such, there is a continuing need for catalysts able to provide better catalytic performance while maintaining reasonable use of platinum group metals.

SUMMARY

The present disclosure describes catalyst compositions including rhodium and iron employed in three-way catalytic (TWC) systems.

In some embodiments, TWCs are configured to include a substrate and one or more of a washcoat layer, an impregnation layer, and/or an overcoat layer. In these embodiments, the washcoat layer is deposited onto the substrate, the impregnation layer is deposited onto the washcoat layer, and the overcoat layer is deposited onto the washcoat/impregnation layer.

In these embodiments, one or more of a washcoat layer and/or an overcoat layer are formed using a slurry that includes one or more of an oxygen storage material, a refractory support oxide, iron, rhodium and the like. Further to these embodiments, said OSM can be a fluorite oxygen storage material including one or more of including Cerium oxide in a range of about 10 wt % Cerium oxide to about 75 wt %, Zirconium-Hafnium oxide in a range of about 25 wt % to about 90 wt %, Lanthanum Oxide in a range of about 0 wt % to about 15 wt %, Neodymium Oxide in a range of about 0 wt % to about 15 wt %, Yttrium Oxide in a range of about 0 wt % to about 15 wt %, and Praseodymium Oxide in a range of about 0 wt % to about 15 wt %. Yet further to these embodiments, said refractory support oxide can be a doped Zirconia, including Praseodymium doped Zirconia. Yet further to these embodiments, said slurry can include iron, added to an OSM powder at a suitable loading level (e.g. loadings within a range from about 4 wt % to about 20 wt %, including loadings of approximately 7.36 wt %). Yet further to these embodiments, said slurry can include rhodium, added to an OSM powder at a suitable loading level (e.g. at a loading level within a range from about 1 gram per cubic foot [g/ft$^3$] to more than 20 g/ft$^3$, including loadings of approximately 4.8 g/ft$^3$).

Further to these embodiments, one or more impregnation layers are formed using one or more of rhodium nitrate, iron nitrate, and/or cerium nitrate, applied to the coated substrate at a desired loading level. In these embodiments, suitable rhodium loadings include loadings within a range of about 2.9 g/ft$^3$ to about 9.8 g/ft$^3$. Further to these embodiments, suitable iron loadings include loadings within a range of about 60 g/ft$^3$ to about 630 g/ft$^3$. Yet further to these embodiments, suitable cerium loadings include loadings within a range of about 499 g/ft$^3$ to about 1497 g/ft$^3$.

In some embodiments, samples are produced for catalytic performance comparisons and to ascertain the effect of varying compositions on catalytic performance. In these embodiments the samples, include, but are not limited to: reference samples made using conventional materials and synthesis methods; samples with a washcoat formed with a Cerium Zirconium Neodymium Yttrium (CZNY) OSM, having a first impregnation layer of rhodium at a loading of 4.8 g/ft$^3$ and a second impregnation layer of iron at 1 wt %, 2 wt %, and 4 wt %, referred to as Type A, B, and C, respectively; samples with a washcoat formed with a Cerium Zirconium Neodymium Yttrium (CZNY) OSM, impregnated with rhodium at a loading of 4.8 g/ft$^3$ and iron at a loading of 60 g/ft$^3$, 90 g/ft$^3$, 150 g/ft$^3$, 210 g/ft$^3$, 315 g/ft$^3$, 420 g/ft$^3$, and 630 g/ft$^3$, referred to as Type D, E, F, G, H, I, and J, respectively; samples having been impregnated with rhodium at a loading of 2.9 g/ft$^3$ and iron at a loading of 210 g/ft$^3$ are formed having a washcoat including a fluorite phase Cerium Zirconium Lanthanum (CZL) OSM, a Cerium Zirconium Neodymium (CZN) OSM, a Cerium Zirconium Yttrium (CZY) OSM, a Cerium Zirconium Lanthanum Praseodymium (CZLP) OSM, a Cerium Zirconium (CZ) OSM, and a Cerium Zirconium Neodymium Yttrium (CZNY) OSM referred to as Type K, L, M, N, O, and P, respectively; samples with a washcoat formed with praseodymium doped zirconia, impregnated with rhodium at a loading of 9.8 g/ft$^3$ and iron at a loading of 210 g/ft$^3$ and Cerium and Yttrium at loadings of 499 gC/ft$^3$ and 0 gY/ft$^3$, 998 gC/ft$^3$ and 0 gY/ft$^3$, 1497 gC/ft$^3$ and 0 gY/ft$^3$, 0 gC/ft$^3$ and 31.7 gY/ft$^3$, 0 gC/ft$^3$ and 158 gY/ft$^3$, and 499 gC/ft$^3$ and 317 gY/ft$^3$ as Type Q, R, S, T, U, and V, respectively; and a sample formed with a washcoat formed from a slurry that includes Iron/OSM powder treated with a Rhodium Nitrate solution, said iron/OSM powder including 7.36 wt % iron and a fluorite phase CZNY OSM, as a Type W catalyst.

In other embodiments, the catalytic performance of TWC systems employing various catalytic materials is evaluated by performing a light-off test to determine the Temperature at which 50% Conversion (T50) and the Temperature at which 90% conversion (T90) of pollutants including Nitrogen Oxides (NOx), Carbon Monoxide (CO), and Hydrocarbons (HC) is achieved. In these embodiments, the catalytic performance of TWC systems is additionally evaluated by performing a Wide Pulse Perturbation Test (WPPT) to determine the TWC performance and kinetically-limited reductive/oxidative storage capacity of said catalyst and illustrate the catalyst's performance during out-of-loop Air-Fuel excursions. Further to these embodiments, a standard isothermal oscillating oxygen storage capacity test to determine the oxygen storage capacity (OSC) of the catalytic material. Yet further to these embodiments, T50 conversion, T90 conversion, WPPT emission percentage conversion, and $O_2$ and CO delay time values associated with a catalyst are evaluated by providing a core sample from the catalyst (e.g., by using a diamond core drill), experimentally aging the core sample using heat in a controlled chemical environment, and testing said core sample with a bench flow reactor to determine TWC performance.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
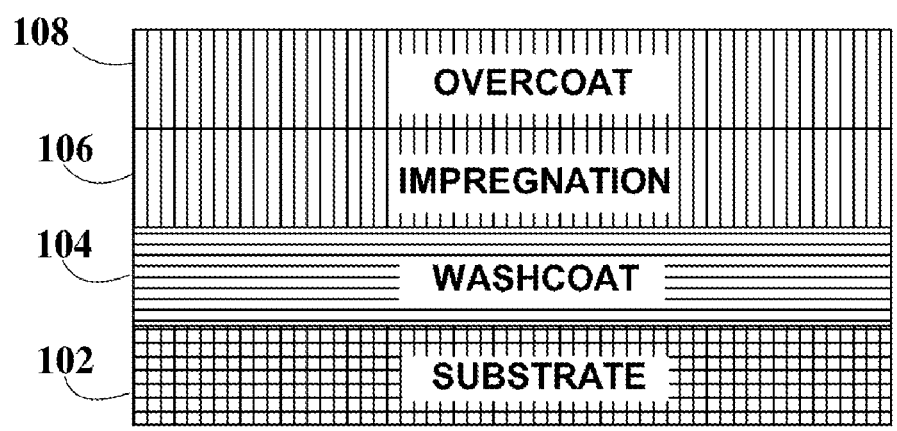
FIG. 1 is a graphical representation illustrating a catalyst structure used for Three-Way Catalyst (TWC) samples including a substrate, a washcoat layer, an impregnation layer, and an overcoat layer, according to an embodiment.

The present disclosure is described herein in detail with reference to embodiments illustrated in the drawings, which form a part hereof. Other embodiments may be used and/or other modifications may be made without departing from the scope or spirit of the present disclosure. The illustrative embodiments described in the detailed description are not meant to be limiting of the subject matter presented.

DEFINITIONS

As used here, the following terms have the following definitions:

"Air/Fuel ratio or A/F ratio" refers to the mass ratio of air to fuel present in a combustion process.

"Calcination" refers to a thermal treatment process applied to solid materials, in presence of air, to bring about a thermal decomposition, phase transition, or removal of a volatile fraction at temperatures below the melting point of the solid materials.

"Catalyst" refers to one or more materials that may be of use in the conversion of one or more other materials.

"Catalyst system" refers to any system including a catalyst, such as, a PGM catalyst or a ZPGM catalyst of at least two layers comprising a substrate, a washcoat and/or an overcoat.

"Conversion" refers to the chemical alteration of at least one material into one or more other materials.

"Lean condition" refers to exhaust gas condition with an R value less than 1, excess oxidants.

"On-board diagnostics", or "OBD", refers to a vehicle's self-diagnostic and reporting capability that provides access to the status of the various vehicle subsystems.

"Platinum group metals (PGM)" refers to platinum, palladium, ruthenium, iridium, osmium, and rhodium.

"R value" refers to the value obtained by dividing the total reducing potential of the gas mixture (in Moles of Oxygen) by the total oxidizing potential of the gas mixture (in moles of Oxygen).

"Rich condition" refers to exhaust gas condition with an R value greater than 1, excess reductants.

"Synthesis method" refers to a process by which chemical reactions and/or mixing occur to form a catalyst from different precursor materials.

"$T_{50}$" refers to the temperature at which 50% of a substance is converted.

"$T_{90}$" refers to the temperature at which 90% of a substance is converted.

"Three-Way Catalyst" refers to a catalyst able to perform the three simultaneous tasks of reduction of nitrogen oxides to nitrogen, oxidation of carbon monoxide to carbon dioxide, and oxidation of unburnt hydrocarbons to carbon dioxide and water.

DESCRIPTION OF THE DRAWINGS

The present disclosure describes catalyst compositions, including Rhodium and Iron, of use in Three Way Catalysts (TWCs).

Catalyst Structure

FIG. 1 is a graphical representation illustrating a catalyst structure used for Three-Way Catalyst (TWC) samples including a substrate and one or more of a washcoat layer, an impregnation layer, and/or an overcoat layer, according to an embodiment. In FIG. 1, TWC Structure 100 includes Substrate 102, Washcoat Layer 104, Impregnation Layer 106, and Overcoat Layer 108. In some embodiments, Washcoat Layer 104 is deposited onto Substrate 102, Impregnation Layer 106 is deposited on top of/into Washcoat Layer 104, and Overcoat Layer 108 is deposited onto Impregnation Layer 106. In other embodiments, TWC Structure 100 can include additional, fewer, or differently arranged components and layers than those illustrated in FIG. 1.

In some embodiments, Substrate 102 is implemented as a ceramic monolith substrate. In these embodiments, Substrate 102 is of a diameter, wall thickness, and cell density suitable for use in a desired application. In an example, Substrate 102 is implemented as a cordierite monolith having a diameter in the range from about 4.16 inches to about 4.66 inches. In this example, Substrate 102 is implemented as having a wall thickness of approximately 3.5 mils. Further to this example, Substrate 102 is implemented as having a cell density in the range from about 400 cells per square inch (CPSI) to about 600 CPSI.

In some embodiments, Washcoat Layer 104 is implemented as a layer including one or more of an oxygen storage material, a refractory support oxide, a Platinum Group Metal (PGM) material, Iron, and the like. In these embodiments, Washcoat Layer 104 is formed by coating a substrate with a slurry at a desired coating concentration. In some embodiments, said slurry includes an oxygen storage material including one or more of Ceria, Zirconia, Neodymia, Yttria, Lanthana, Praseodymia, and the like. In other embodiments, said slurry includes a refractory support oxide, such as for example a doped zirconia. In yet other embodiments, said slurry includes an oxygen storage material powder comprising iron oxide, and rhodium nitrate solution is applied. In these embodiments, the coated substrate is then calcined at a desired temperature.

In an example, Washcoat Layer 104 is formed by coating Substrate 102 with a slurry at a coating concentration ranging from about 58 grams per liter (g/l) to about 90 g/L. In some embodiments, said slurry includes a Cerium Zirconium-Hafnium Neodymium Yttrium (CZNY) oxygen storage material. In these embodiments, said CZNY OSM is a fluorite phase OSM including 31 wt % Cerium Oxide, 58.3 wt % Zirconium-Hafnium Oxide, 5.5 wt % Neodymium Oxide, and 5.2 wt % Yttrium Oxide. In other embodiments, rhodium solution (e.g., rhodium nitrate) is added to said CZNY OSM at a desired material loading level (e.g. 4.8 g/ft$^3$) using a suitable method, such as, for example pH controlled surface adsorption. In these embodiments, after coating Substrate 102 with said slurry, Substrate 102 is calcined for four hours at about 550° C.

In another example, Washcoat Layer 104 is formed by coating Substrate 102 with a slurry at a coating concentration in the range from about 87 g/l to 100 g/l. In some embodiments, said slurry includes one or more of a Cerium Zirconium Lanthanum (CZL) OSM, a Cerium Zirconium Neodymium (CZN) OSM, a Cerium Zirconium Yttrium (CZY) OSM, a Cerium Zirconium (CZ) OSM, a Cerium Zirconium Lanthanum Praseodymium (CZLP) OSM, and the like. In these embodiments, said OSMs are a fluorite phase OSM including Cerium oxide in a range from about 10 wt % Cerium oxide to about 75 wt %, Zirconium-Hafnium oxide in a range from about 25 wt % to about 90 wt %, Lanthanum Oxide in a range from about 0 wt % to about 15 wt %, Neodymium Oxide in a range from about 0 wt % to about 15 wt %, Yttrium Oxide in a range from about 0 wt % to about 15 wt %, and Praseodymium Oxide in a range from about 0 wt % to about 15 wt %. Further to these embodiments, after coating Substrate 102 with said slurry, Substrate 102 is calcined for four hours at about 550° C.

In yet another example, Washcoat Layer 104 is formed by coating Substrate 102 with a slurry at a coating concentration of approximately 60 g/l. In some embodiments, said slurry includes a doped zirconia support oxide. In these embodiments, said doped zirconia includes 90 wt % Zirconium-Hafnium oxide and 10 wt % Praseodymium oxide. Further to these embodiments, after coating Substrate 102 with said slurry, Substrate 102 is calcined for four hours at about 550° C. In a further example, Washcoat Layer 104 is formed by coating Substrate 102 with a slurry at a coating concentration of about 100 g/l. In some embodiments, said slurry includes an Iron/OSM powder impregnated with Rhodium, the pH of said slurry controlled so that the rhodium is well dispersed onto the surface of said OSM powder. Further to these embodiments, said Iron/OSM powder includes iron at a loading level within a range from about 4 wt % to about 20 wt %, including a loading level of approximately 7.36 wt %. Yet further to these embodiments, said rhodium can be added at a loading level within a range from about 1 g/ft$^3$ to more than 20 g/ft$^3$, including a loading level of approximately 4.8 g/ft$^3$. Yet further to these embodiments, after coating Substrate 102 with said slurry, Substrate 102 is calcined for four hours at about 550° C. In other embodiments, Washcoat layer 104 is implemented as a conventional washcoat formed using conventional techniques.

In some embodiments, Impregnation Layer 106 is implemented as a layer including one or more catalyst compositions, said layer being formed over Washcoat Layer 104. In these embodiments, said catalyst compositions include one or more of a PGM and/or non-precious metals. In an example, Substrate 102 having Washcoat Layer 104 is impregnated with a water-based solution including rhodium nitrate, followed by calcination at around 550° C. In this example, the concentration of rhodium nitrate in the applied solution is such that the rhodium material loading in the final part is within a range from about 2.9 g/ft$^3$ to about 9.8 g/ft$^3$. In another example, Substrate 102 having Washcoat Layer 104 is impregnated with a water-based solution including rhodium nitrate and one or more of iron nitrate and/or cerium nitrate, followed by calcination at around 550° C. In this example, the concentration of iron nitrate in the applied solution is such that the iron content in the final part is within a range from about 60 g/ft$^3$ to about 630 g/ft$^3$. Further to this example, the concentration of cerium nitrate in the applied solution is such that the cerium content in the final part is within a range from about 499 g/ft$^3$ to about 1497 g/ft$^3$.

In some embodiments, Washcoat Layer 104 is impregnated with a water-based solution including palladium nitrate, followed by calcination at around 550° C. to produce Impregnation Layer 106. In other embodiments, Impregnation Layer 106 includes one or more catalysts or catalyst precursors substantially free of PGMs, such as, binary Cu—Mn spinels, ternary Cu—Mn spinels, and the like.

In some embodiments, Overcoat Layer 108 is implemented as a layer formed over a substrate coated with one or more of Washcoat Layer 104 and/or Impregnation Layer 106. In some embodiments, Overcoat Layer 108 is implemented as a layer substantially similar to Washcoat Layer 104. In these embodiments, said substrate is coated with a slurry at a desired coating concentration, said slurry including one or more of an oxygen storage material, a refractory support oxide, a rhodium impregnated Iron/OSM powder, and the like. In these embodiments, the coated substrate is then calcined at a desired temperature. In other embodiments, Overcoat Layer 108 is implemented as a layer including one or more of an OSM and a refractory support oxide formed by applying a slurry including said OSM and/or said refractory support oxide over said substrate, followed by calcination at a desired temperature. In these embodiments, a second impregnation layer, not shown, may be applied over Overcoat Layer 108. In an example, said second impregnation layer is implemented as an impregnation layer substantially similar to Impregnation Layer 106. In another example, said second impregnation layer is formed by applying a palladium nitrate solution over Overcoat Layer 108. In this example, the palladium loading is in a range from about 5 g/ft$^3$ to about 50 g/ft$^3$.

In other embodiments, TWC Structure 100 includes additional, fewer, or differently arranged layers than those illustrated in FIG. 1. In an example, TWC Structure 100 includes Substrate 102 and Washcoat Layer 104. In this example, Washcoat Layer 104 is implemented as a layer including an Iron/OSM powder impregnated with Rhodium. In another example, TWC Structure 100 includes Substrate 102, Washcoat Layer 104, and Overcoat Layer 108. In this example, Washcoat Layer 104 is implemented as a layer including an OSM and stabilized alumina, impregnated with palladium at a desired loading. Further to this example, Overcoat Layer 108 is implemented as a layer including an OSM and impregnated with Rhodium applied at a desired material loading and Iron applied at a desired material loading.

Catalyst Testing Methodology

In some embodiments, the performance of catalysts can evaluated by performing a light-off test to determine the Temperature of 50% Conversion (T50) of Nitrogen Oxides (NOx), Carbon Monoxide (CO), and Hydrocarbons (HC). In other embodiments, the efficiency of catalysts can additionally be evaluated by performing a light-off test to determine the Temperature of 90% Conversion (T90) of NOx, CO, and HC.

In some embodiments, the T50 and T90 values associated with a catalyst are evaluated by taking a core sample from the catalyst (e.g., by using a diamond core drill). In these embodiments, the core sample is then experimentally aged using heat in a controlled chemical environment in order to simulate the aging of a catalyst associated with driving a vehicle a desired number of miles. In an example, 1 inch diameter cores having a length of 2 inches are aged at 1000° C. in a chemical environment including 10 percent by mole (mol %) water vapor, 10 mol % carbon dioxide, nitrogen to balance, and varying amounts of carbon monoxide and oxygen. In this example, the experimental aging process simulates the thermal aging associated with driving a vehicle from about 50,000 miles to about 120,000 miles. Further to this example, the experimental aging process includes simulations of both fuel cut like events with high oxygen content (e.g., lean conditions/events), and rich events below 13 Air/Fuel (A/F) ratio units. In this example, the cores are then cooled in said chemical environment to a temperature within the range from about 200° C. to about 300° C. and removed from the experimental aging system.

In further embodiments, said core sample is tested on a bench flow reactor able to test at least TWC performance. In these embodiments, the core is conditioned in said bench reactor by at least a 10 minute conditioning at 600° C. in a slightly rich gas stream (e.g., R-value of 1.05 include it in the definition) with nearly symmetric lean and rich perturbations at a frequency of 1 Hz. In an example, a light-off test is used to determine catalytic performance. In this example, the gas stream used for the test includes 8000 ppm carbon monoxide, 2000 ppm hydrogen, 400 ppm (C3) propene, 100 ppm (C3) propane, 1000 ppm nitric oxide, 100,000 ppm water, 100,000 ppm carbon dioxide, and nitrogen for the remaining amount. Further to this example, the oxygen level within the gas stream is varied, as a square wave, from 4234 ppm to 8671 ppm with a frequency of 0.5 Hz. Yet further to this example, the average R-value for the gas stream is 1.05, and the square wave change in oxygen gives an air to fuel ration span of about 0.4 A/F units. In this example, the space velocity is about 90,000 h$^{-1}$ at the standard conditions of 21.1° C., 1 atm with the total volume enclosed by the core surface used as the volume for the space velocity calculation. In another example, the temperature is stabilized at 100° C. for 2 minutes, and the gas temperature ramped at 40° C. per minute to 500° C. In this example, a gas blanket warming the core holder is ramped at the same set point temperature. Further to this example, the conversion of the gas species is then determined, and the temperature points of 50%, and 90% conversion are recorded.

In other embodiments, the performance of catalysts can be evaluated by performing a Wide Pulse Perturbation Test (WPPT) to determine the TWC performance and kinetically-limited reductive/oxidative storage capacity of said catalyst. In these embodiments, the WPPT is illustrative of the catalytic performance of said catalysts during out-of-loop A/F excursions, hence more closely approximating a real drive cycle when compared to a conventional light-off test. In this example, when the average R-value for the provided gas stream is 1.05 and is combined with the square wave change in oxygen having a period of about 8 seconds, the result is an air to fuel ration span of about 0.8 A/F units. Further to this example, after a 2 minute settling time the NOx, HC, and CO emissions are measured every second and averaged over a 5 minute interval. In this example, the net conversion is calculated for each pollutant and a high conversion is associated with lower emissions from the catalytic converter, when applied to a vehicle or stationary engine.

In yet other embodiments, the standard isothermal oxygen storage capacity (OSC) test is performed on catalyst samples at a temperature of about 525° C. with a feed of either $O_2$ with a concentration of about 4,000 ppm diluted in inert nitrogen ($N_2$) simulating a lean cycle, or CO with a concentration of about 8,000 Ppm of CO diluted in inert $N_2$ simulating a rich cycle. In these embodiments, the isothermal oscillating OSC test is performed within a quartz reactor using a space velocity (SV) of 60,000 hr$^{-1}$, ramping from room temperature to a temperature of about 525° C. in a dry $N_2$ environment. Further to these embodiments, when the temperature of about 525° C. is reached, the isothermal OSC test is initiated by flowing $O_2$ through the catalyst samples within the reactor. After about 240 seconds, the feed flow is switched to CO allowing CO to flow through the catalyst samples within the reactor for another 240 seconds. In some embodiments, OSC testing enables oscillating conditions, between CO and $O_2$ flows, during different times on stream thereby allowing the collection of data associated with the amount of CO and $O_2$ within the flows. In these embodiments, $O_2$ and CO are allowed to flow within an empty test reactor (before or after the OSC test) in order to establish test reactor benchmarks.

In some embodiments, the OSC stability properties of catalyst samples are determined by using CO and $O_2$ pulses under standard isothermal oscillating conditions. In these embodiments, the OSC test facilitates the determination of $O_2$ and CO delay times for an extended number of rich and lean cycles to verify the OSC stability of the catalyst samples. Further to these embodiments, the $O_2$ and CO delay times are the times required to reach 50% of the $O_2$ and CO concentrations within the feed signal, respectively. The $O_2$ and CO delay times are used as parameters for the determination of the effective oxygen storage capacity of catalyst samples.

Catalysts Tested

In some embodiments, reference samples are produced for catalytic activity comparisons and to ascertain the catalytic conversion efficiency of the materials disclosed herein. In these embodiments, a first reference catalyst (REF#1) and second reference catalyst (REF#2) are produced using conventional materials and synthesis methods. Further to these embodiments, a 1 L cordierite substrate having a 4.16 inch diameter, 400 CPSI cell density, and 3.5 mils wall thickness is coated with a slurry at a coating concentration of 58 g/L for REF#1. Yet further to these embodiments, said slurry includes a proprietary Cerium, Zirconium, Neodymium, Yttrium Oxide, fluorite phase (CZNY) OSM. In an example, said proprietary CZNY OSM is a fluorite phase OSM that includes 31 wt % Cerium Oxide, 58.3 wt % Zirconium-Hafnium Oxide, 5.5 wt % Neodymium Oxide, and 5.2 wt % Yttrium Oxide. In these embodiments, rhodium is added to the oxides in the slurry via pH controlled surface adsorption at a loading concentration of 4.8 g/ft$^3$. Further to these embodiments, the samples were then calcined to achieve coating adhesion of the ceramic layer onto the surface of the cordierite substrate, thereby forming a washcoat layer. Yet further to these embodiments, a 2 inch core is extracted from said cordierite substrate and calcined in a nitrogen-rich environment as the temperature is increased from about room temperature to about 1000° C.

In other embodiments, a 1 L cordierite substrate having a 4.16 inch diameter, 400 CPSI cell density, and 3.5 mils wall thickness is coated with a slurry at a coating concentration of 90 g/L for REF#2. In these embodiments, said slurry includes a proprietary Cerium, Zirconium, Neodymium, Yttrium Oxide, fluorite phase (CZNY) OSM. In an example, said proprietary CZNY OSM is a fluorite phase OSM that includes 31 wt % Cerium Oxide, 58.3 wt % Zirconium-Hafnium Oxide, 5.5 wt % Neodymium Oxide, and 5.2 wt % Yttrium Oxide. In these embodiments, rhodium is added to the oxides in the slurry via pH controlled surface adsorption at a loading concentration of 9.8 g/ft$^3$. Further to these embodiments, the samples were then calcined to achieve coating adhesion of the ceramic layer onto the surface of the cordierite substrate, thereby forming a washcoat layer.

In some embodiments, a set of samples including an OSM impregnated and with rhodium are produced for catalytic performance comparisons and to ascertain the effect of impregnating varying amounts of iron into a rhodium catalyst. In these embodiments, a first catalyst (Type A), a second catalyst (Type B), and a third catalyst (Type C) are produced using methods substantially similar to those described in FIG. 1. Further to these embodiments, a 1 L cordierite substrate having a 4.16 inch diameter, 400 CPSI cell density, and a 3.5 mils wall thickness is coated with a slurry that includes a CZNY OSM at a loading of 58 g/l, where rhodium has been added to said CZNY OSM's surface by pH controlled surface adsorption at a loading of 4.8 g/ft$^3$. In these embodiments, said CZNY OSM is a fluorite phase OSM that includes 31 wt % Cerium Oxide, 58.3 wt % Zirconium-Hafnium Oxide, 5.5 wt % Neodymium Oxide, and 5.2 wt % Yttrium Oxide. Yet further to these embodiments, the coated substrate is calcined and 2 inch diameter cores are extracted. In these embodiments, the sample cores are impregnated with iron nitrate in a manner such that the iron level in the core is 1% of the coating mass for catalyst Type A, 2% of the coated mass for catalyst Type B, and 4% of the coated mass for catalyst Type C. Further to these embodiments, the cores are calcined in a nitrogen-rich environment as the temperature is increased from about room temperature to about 1000° C.

TABLE 2

T50 values and WPPT @ 550° C. emission percentage conversion values for Type A, Type B, and Type C catalysts.

|   | Standard LOT50 | | | 550 C. WPPT Emission percentage Conversion @ 550° C. | | | Primary Variable Iron Loading | |
|---|---|---|---|---|---|---|---|---|
|   | NOx | CO | HC | NOx | CO | HC | g/ft$^3$ | wt % |
| A | 305.5 | 313.5 | 344.4 | 65.5% | 67.5% | 74.7% | 16 | 1.0% |
| B | 279.0 | 277.4 | 312.5 | 69.8% | 81.4% | 82.0% | 34 | 2.0% |
| C | 258.6 | 256.8 | 283.8 | 72.9% | 87.1% | 86.0% | 68 | 4.0% |

In other embodiments, another set of samples including a CZNY OSM and impregnated with rhodium and iron are produced for catalytic performance comparisons and to ascertain the effect of impregnating varying amounts of iron into a rhodium catalyst. In these embodiments a First Catalyst (Type D), a second catalyst (Type E), a third catalyst (Type F), a fourth catalyst (Type G), a fifth catalyst (Type H), a sixth catalyst (Type I), and a seventh catalyst (Type J) are produced using methods substantially similar to those described in FIG. 1. Further to these embodiments, a 1 L cordierite substrate having a 4.16 inch diameter, 400 CPSI cell density, and a 3.5 mils wall thickness is coated with a slurry that includes a CZNY OSM at a loading of 90 g/l. In these embodiments, said CZNY OSM is a fluorite phase OSM that includes 31 wt % Cerium Oxide, 58.3 wt % Zirconium-Hafnium Oxide, 5.5 wt % Neodymium Oxide, and 5.2 wt % Yttrium Oxide. Yet further to these embodi-

TABLE 1

T50 values, T90 values, WWPT @ 550° C. emission percentage conversion values, WWPT @ 400° C. emission percentage conversion values, and Delay Time @ 525° C. for REF#1 and REF#2 catalysts.

|   | T50 (° C.) | | | T90 (° C.) | | | Emission percentage Conversion @ 550° C. | | | Emission percentage Conversion @ 400° C. | | | Delay Time at 525° C. (s) | |
|---|---|---|---|---|---|---|---|---|---|---|---|---|---|---|
|   | NOx | CO | HC | NOx | CO | HC | NOx | CO | HC | NOx | CO | HC | CO | O2 |
| REF#1 | 410.5 | 423.3 | 419.2 | — | — | — | 64.0% | 47.1% | 72.2% | — | — | — | — | — |
| REF#2 | 354.5 | 370.5 | 390.3 | 404.5 | 465.8 | 550 | — | — | — | 81.8% | 53.2% | 60.5% | 4.3 | 8.1 | ments, the coated substrate is calcined to achieve adhesion of the ceramic-coating layer onto the cordierite, thereby forming a washcoat layer. In these embodiments, the coated substrates are then impregnated with rhodium nitrate at a loading concentration of 9.8 g/ft$^3$, and iron nitrate at a loading concentration of 60 g/ft$^3$ for catalyst Type D, 90 g/ft$^3$ for catalyst Type E, 150 g/ft$^3$ for catalyst Type F, 210 g/ft$^3$ for catalyst Type G, 105 g/ft$^3$ for catalyst Type H, and 210 g/ft$^3$ for catalyst Type I and catalyst Type J. Further to these embodiments, the substrates are then calcined. Yet further to these embodiments, the coated substrates undergo a second impregnation iron nitrate at a loading concentration of 210 g/ft$^3$ for catalyst Types H, I, and J. Further to these embodiments, the substrates are calcined. Yet further to these embodiments, the coated substrates undergo a third impregnation iron nitrate at a loading concentration of 210 g/ft$^3$ for catalyst Type J. Further to these embodiments, the substrates are then calcined and a 2 inch core is extracted from said cordierite substrates.

includes a fluorite phase OSM at a loading of 87 g/l for catalyst Type K, 88 g/l for catalyst Type L, 90 g/l for catalyst Type M, 89 g/l for catalyst Type N, 86 g/l for catalyst Type O, and 90 g/l for catalyst Type P. Yet further to these embodiments, said OSM is a CZL OSM for catalyst Type K, a CZN OSM for catalyst Type L, a CZY OSM for catalyst Type M, a CZLP OSM for catalyst Type N, a CZ OSM for catalyst Type O, and a CZNY OSM for catalyst Type P. In these embodiments, said CZL OSM includes 30 wt % Cerium Oxide, 60 wt % Zirconium-Hafnium Oxide, and 10 wt % Lanthanum Oxide; said CZN OSM includes 30 wt % Cerium Oxide, 60 wt % Zirconium-Hafnium Oxide, and 10 wt % Neodymium Oxide; said CZY OSM includes 30 wt % Cerium Oxide, 60 wt % Zirconium-Hafnium Oxide, and 10 wt % Yttrium Oxide; said CZLP OSM includes 30 wt % Cerium Oxide, 60 wt % Zirconium-Hafnium Oxide, 5 wt % Lanthanum Oxide, and 5 wt % Praseodymium Oxide; said CZ OSM includes 75 wt % Cerium Oxide and 30% Zirconium-Hafnium Oxide; and said CZNY OSM includes 31 wt

TABLE 3

T50 values, T90 values, WWPT @ 550° C. emission percentage conversion values, and the Delay Time @ 525° C. for Type D, Type E, Type F, Type G, Type H, Type I, and Type J catalysts.

|   | T50 (° C.) | | | T90 (° C.) | | | Emission percentage Conversion @ 400° C. | | | Delay Time at 525° C. (s) | | Iron Loading | |
|---|---|---|---|---|---|---|---|---|---|---|---|---|---|
|   | NOx | CO | HC | NOx | CO | HC | NOx | CO | HC | CO | O$_2$ | g/ft$^3$ | wt % |
| D | 257.7 | 254.9 | 283.2 | 315.0 | 267.4 | 386.6 | 78.1% | 86.0% | 80.2% | 5 | 10.1 | 60 | 2.3% |
| E | 253.5 | 249.4 | 275.1 | 304.6 | 262.5 | 366.6 | 80.4% | 88.6% | 81.3% | 5.8 | 10.9 | 90 | 3.4% |
| F | 242.7 | 238.4 | 260.9 | 284.9 | 250.7 | 330.6 | 82.9% | 91.7% | 83.3% | 7.4 | 12.7 | 150 | 5.6% |
| G | 242.8 | 238.8 | 259.8 | 278.4 | 249.0 | 338.9 | 86.7% | 93.0% | 84.6% | 8.9 | 15.1 | 210 | 7.6% |
| H | 238.8 | 233.8 | 252.0 | 268.7 | 241.2 | 318.4 | 91.2% | 96.4% | 87.7% | 12.5 | 19.1 | 315 | 11.0% |
| I | 231.8 | 228.4 | 247.0 | 258.1 | 239.7 | 311.0 | 98.9% | 98.2% | 89.7% | 15.6 | 23.3 | 420 | 14.2% |
| J | 241.2 | 236.3 | 252.8 | 267.8 | 245.2 | 323.0 | 99.2% | 98.2% | 88.9% | 19.2 | 28.1 | 630 | 19.8% |

In yet other embodiments, yet another set of samples including a desired OSM and impregnated with rhodium and iron are produced for catalytic performance comparisons and to ascertain the effect of different OSMs on the catalytic performance of a rhodium iron catalyst. In these embodiments a First Catalyst (Type K), a second catalyst (Type L), a third catalyst (Type M), a fourth catalyst (Type N), a fifth catalyst (Type O), and a sixth catalyst (Type P) are produced using methods substantially similar to those described in FIG. 1. Further to these embodiments, a 1 L cordierite substrate having a 4.16 inch diameter, 400 CPSI cell density, and a 3.5 mils wall thickness is coated with a slurry that % Cerium, 58.3 wt % Zirconium-Hafnium, 5.5 wt % Neodymium, and 5.2 wt % Yttrium Oxide. Further to these embodiments, the coated substrate is calcined to achieve adhesion of the ceramic-coating layer onto the cordierite substrate, thereby forming a washcoat layer. In these embodiments, the coated substrates are then impregnated with rhodium nitrate at a loading concentration of 2.9 g/ft$^3$ and iron nitrate at a loading concentration of 210 g/ft$^3$. Further to these embodiments, the substrates are then calcined and a 2 inch core is extracted from said cordierite substrates.

TABLE 4

T50 values, T90 values, Delay Time @ 525° C., and OSM composition for Type K, Type L, Type M, Type M, Type N, Type O, and Type P catalysts.

|   | T50 (° C.) | | | T90 (° C.) | | | Delay Time at 525° C. (s) | | OSM Composition (wt %) | | | | | |
|---|---|---|---|---|---|---|---|---|---|---|---|---|---|---|
|   | NOx | CO | HC | NOx | CO | HC | CO | O$_2$ | C | Zr | Nd | Y | La | Pr |
| K | 262.9 | 255.6 | 286.6 | 308.2 | 265.2 | 383.6 | 4.16 | 9.54 | 30 | 60 | — | — | 10 | — |
| L | 257.3 | 251.7 | 280.5 | 307.0 | 260.7 | 339.7 | 7.26 | 13.71 | 30 | 60 | 10 | — | — | — |
| M | 262.7 | 257.2 | 285.3 | 312.1 | 265.9 | 351.3 | 7.58 | 13.79 | 30 | 60 | — | 10 | — | — |
| N | 259.0 | 252.2 | 282.9 | 303.4 | 263.0 | 370.7 | 5.34 | 10.77 | 30 | 60 | — | — | 5 | 5 |
| O | 274.6 | 265.5 | 306.1 | 364.6 | 278.1 | 453.0 | — | — | 75 | 25 | — | — | — | — |
| P | 265.6 | 259.1 | 288.7 | 323.6 | 269.3 | 390.2 | 7.15 | 12.72 | 31 | 58.3 | 5.5 | 5.5 | — | — |

In other embodiments, another set of samples including a doped zirconia and impregnated with rhodium, iron, and one or more of cerium and/or yttrium are produced for catalytic performance comparisons and to ascertain the effect of impregnating varying amounts of cerium and yttrium on a rhodium-iron catalyst. In these embodiments a First Catalyst (Type Q), a second catalyst (Type R), a third catalyst (Type S), a fourth catalyst (Type T), a fifth catalyst (Type U), and a sixth catalyst (Type V) are produced using methods substantially similar to those described in FIG. 1. Further to these embodiments, a 1 L cordierite substrate having a 4.66 inch diameter, 600 CPSI cell density, and a 3.5 mils wall thickness is coated with a slurry that includes a refractory support oxide at a loading of 90 g/l. In these embodiments, said refractory support oxide is a doped zirconia that includes 90 wt % Zirconium-Hafnium Oxide and 10 wt % Praseodymium Oxide. Yet further to these embodiments, the coated substrate is calcined to achieve adhesion of the ceramic-coating layer onto the cordierite substrate, thereby forming a washcoat layer. In these embodiments, the coated substrates are then impregnated with rhodium nitrate at a loading concentration of 9.8 g/ft$^3$, and iron nitrate at a loading of 210 g/ft$^3$. Further to these embodiments, the substrates are additionally impregnated with cerium nitrate at a loading concentration of 499 g/ft$^3$ for catalysts Types Q and T, 998 g/ft$^3$ for catalyst Type R, 1497 g/ft$^3$ for catalyst Type S, and 0 g/ft$^3$ for catalyst Types T and U and with yttrium nitrate at a loading concentration of 31.7 g/ft$^3$ for catalyst Type T, 158 g/ft$^3$ for catalyst Type U, and 317 g/ft$^3$ for catalyst Type V. Further to these embodiments, the substrates are then calcined to generate the oxides within the porous wash-coat and a 2 inch core is extracted from said cordierite substrates.

TABLE 5

T50 values, T90 values, Delay Time @ 525° C., Ceria loading, and Yttrium Loading for Type Q, Type R, Type S, Type T, Type U, and Type V catalysts.

| | T50 (° C.) | | | T90 (° C.) | | | Delay Time at 525° C. (s) | | Loading (g/ft$^3$) | |
|---|---|---|---|---|---|---|---|---|---|---|
| | NOx | CO | HC | NOx | CO | HC | CO | O$_2$ | Ce | Y |
| Q | 247.3 | 243.4 | 266.5 | 289.7 | 247.3 | 347.2 | 3.9 | 7.6 | 499 | 0 |
| R | 242.6 | 238.0 | 258.4 | 282.5 | 245.1 | 319.4 | 5.6 | 10.6 | 998 | 0 |
| S | 244.0 | 239.7 | 261.2 | 285.9 | 246.8 | 324.2 | 5.6 | 10.6 | 1497 | 0 |
| T | 245.3 | 242.7 | 267.0 | 342.3 | 249.9 | 379.9 | 1.4 | 3.3 | 0 | 31.7 |
| U | 245.4 | 241.2 | 266.7 | 293.0 | 247.2 | 363.2 | 2.3 | 4.7 | 0 | 158 |
| V | 242.0 | 238.3 | 259.3 | 277.6 | 244.7 | 321.3 | 5.4 | 9.4 | 499 | 317 |

In other embodiments, yet another sample including a substrate coated with an Iron/OSM powder impregnated with Rhodium is prepared to ascertain the feasibility of forming a Rhodium Iron catalyst by coating a cordierite substrate with a bulk powder washcoat. In these embodiments, a Type W catalyst is produced using methods substantially similar to those described in FIG. 1. Further to these embodiments, a 2 kg batch of a fluorite phase CZNY OSM powder that includes 31 wt % Cerium, 58.3 wt % Zirconium-Hafnium, 5.5 wt % Neodymium, and 5.2 wt % Yttrium Oxide is impregnated with an iron nitrate solution having a total liquid volume less than the OSM's pore volume so as to form a wet powder. The resulting wet powder is first dried at a temperature of approximately 120° C. until substantially all of the solvent of the solution is evaporated, and then fired at 750° C. for about 2 hours. In these embodiments, the powder formed includes 7.36 wt % Fe. Further to these embodiments, a slurry is prepared using said powder and a rhodium nitrate solution and the pH of the slurry is adjusted so that the rhodium attaches onto the surface of the CZNY OSM. Said slurry is used to coat a 1 L cordierite substrate having a 4.66 inch diameter, 600 CPSI cell density, and 3.5 mils wall thickness at a loading level of about 100 g/L. The substrate is then calcined to achieve adhesion of the coated-ceramic-layer onto the cordierite substrate thereby forming a washcoat layer, and a 2 inch core is then extracted from said cordierite substrate.

TABLE 6

T50 values and T90 values for a Type W catalyst.

| | T50 (° C.) | | | T90 (° C.) | | |
|---|---|---|---|---|---|---|
| | NOx | CO | HC | NOx | CO | HC |
| W | 262.1 | 256.6 | 287.6 | 321.1 | 269.8 | 365.9 |

Figure 2:
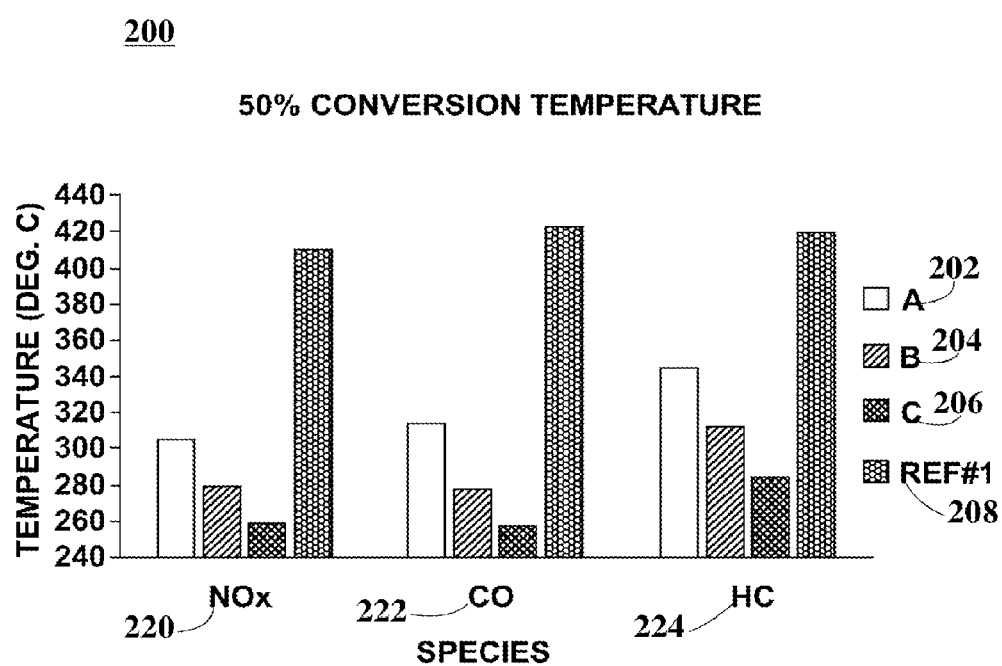
FIG. 2 is a graphical representation illustrating a comparison of T50 values of NOx, CO, and HC for REF#1 and Type A, B, and C catalysts, according to an embodiment.

FIG. 2 is a graphical representation illustrating a comparison of T50 values of NOx, CO, and HC for REF#1 (see Table 1) and Type A, B, and C (see Table 2) catalysts, according to an embodiment. In FIG. 2, T50 Chart 200 illustrates the 50% conversion temperature for NOx 220, CO 222, and HC 224 associated with each catalyst for catalyst Type A 202, catalyst Type B 204, catalyst Type C 206, and catalyst REF#1 208.

In some embodiments, a decreasing trend in 50% conversion temperature value is observed as the iron loading increases from 1 wt % in Type A 202 to 4 wt % in Type C 206. In these embodiments, it is observed that Type A 202, Type B 204, and Type C 206 compare favorably to REF#1 208, thereby indicating a significant improvement associated with the inclusion of iron in the catalyst.

Figure 3:
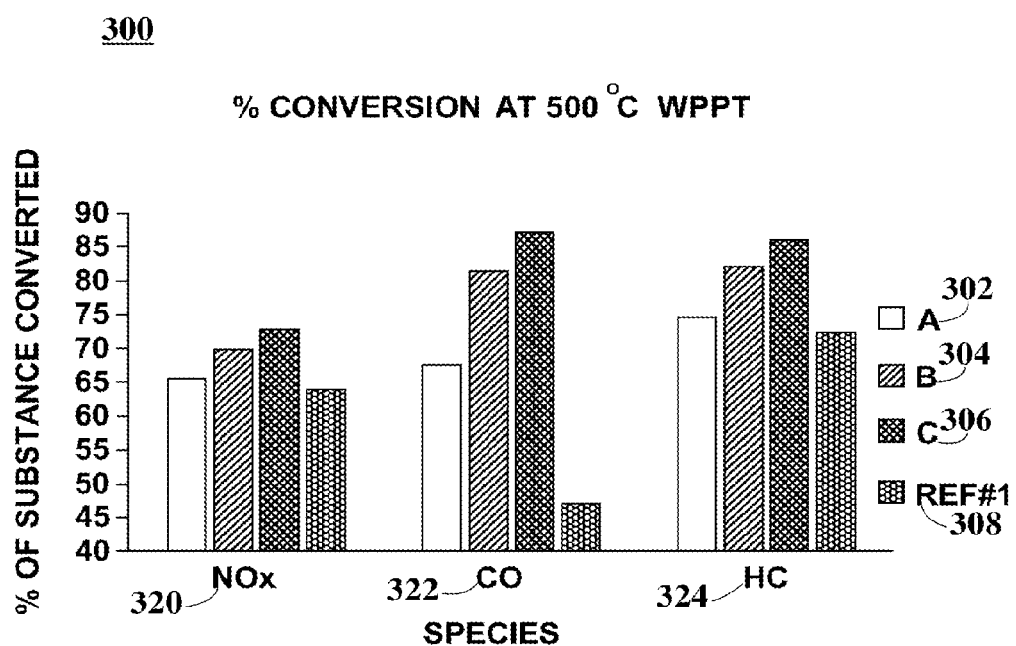
FIG. 3 is a graphical representation illustrating a comparison of WPPT percentage conversion values of NOx, CO, and HC for REF#1 and Type A, B, and C catalysts, according to an embodiment.

FIG. 3 is a graphical representation illustrating a comparison of emission percentage conversion values of NOx, CO, and HC for REF#1 (see Table 1) and Type A, B, and C (see Table 2) catalysts, according to an embodiment. In FIG. 3, Conversion Chart 300 illustrates the emission percentage conversion value for NOx 320, CO 322, and HC 324 associated with each catalyst for Type A 302, Type B 304, Type C 306, and REF#1 308 having undergone a WPPT at 500° C.

In some embodiments, an increasing trend in emission percentage conversion value is observed as the iron loading increases from 1 wt % in Type A 202 to 4 wt % in Type C 206. In these embodiments, it is observed that Type A 202, Type B 204, and Type C 206 compare favorably to REF#1 208, thereby indicating an improvement associated with the inclusion of iron in the catalyst.

Figure 4:
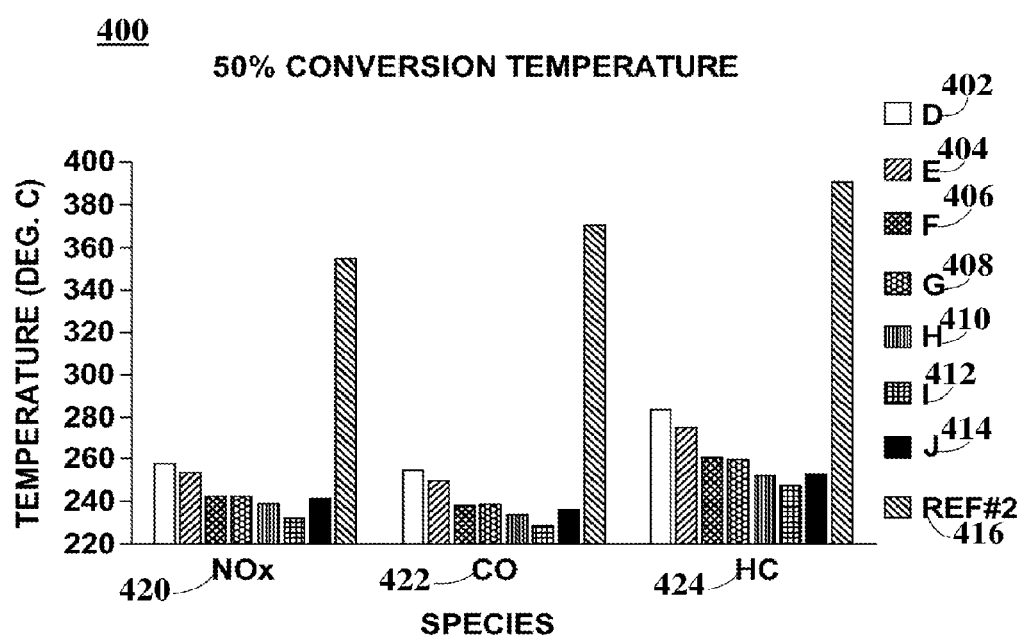
FIG. 4 is a graphical representation illustrating a comparison of T50 values of NOx, CO, and HC for REF#2 and Type D, E, F, G, H, I, and J catalysts, according to an embodiment.

FIG. 4 is a graphical representation illustrating a comparison of T50 values of NOx, CO, and HC for REF#2 (see Table 1) and Type D, E, F, G, H, I, and J (see Table 3) catalysts, according to an embodiment. In FIG. 4, T50 Chart 400 illustrates the 50% conversion temperature value for NOx 420, CO 422, and HC 424 associated with each catalyst for Type D 402, Type E 404, Type F 406, Type G 408, Type H 410, Type I 412, Type J 414, and REF#2 416.

In some embodiments, a decreasing trend in 50% conversion temperature value can generally be observed as the iron loading increases from 60 g/ft$^3$ in Type D 402 to 420 g/ft$^3$ in Type I 412, with Type J 414 at a loading concentration of 630 g/ft$^3$ showing an increase in T50 value when compared to Type I 412. In these embodiments, it is observed that Type D 402, Type E 404, Type F 406, Type G 408, Type H 410, Type I 412, and Type J 414 compare favorably to REF#2 416, thereby indicating an improvement associated with the inclusion of iron in the catalyst up to a threshold amount (e.g. Type I 412). Further to these embodiments, it is also observed that while catalyst Type I 412 compares favorably to catalyst Type G 408, catalyst Type G 408 may require a lower Iron loading level which may also require fewer impregnation steps.

Figure 5:
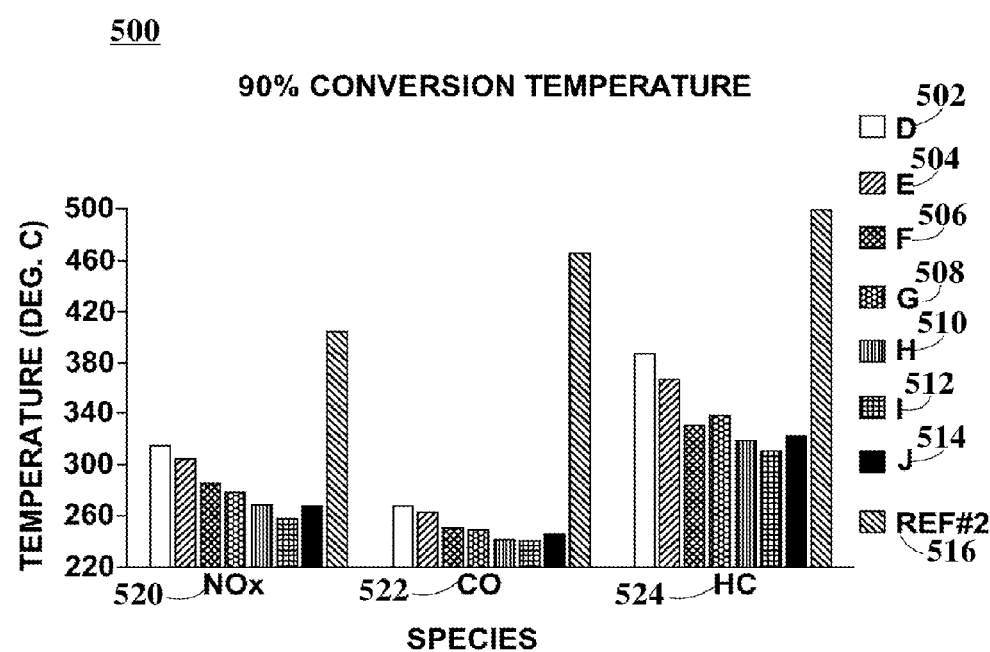
FIG. 5 is a graphical representation illustrating a comparison of T90 values of NOx, CO, and HC for REF#2 and Type D, E, F, G, H, I, and J catalysts, according to an embodiment.

FIG. 5 is a graphical representation illustrating a comparison of T90 values of NOx, CO, and HC for REF#2 (see Table 1) and Type D, E, F, G, H, I, and J (see Table 3) catalysts, according to an embodiment. In FIG. 5, T90 Chart 500 illustrates the 90% conversion temperature for NOx 520, CO 522, and HC 524 associated with each catalyst for Type D 502, Type E 504, Type F 506, Type G 508, Type H 510, Type I 512, Type J 514, and REF#2 516.

In some embodiments, a decreasing trend in 90% conversion temperature value can generally be observed as the iron loading increases from 60 g/ft$^3$ in Type D 502 to 420 g/ft$^3$ in Type I 412, with Type J 414 at a loading concentration of 630 g/ft$^3$ showing an increase in T90 value when compared to Type I 412. In these embodiments, it is observed that Type D 502, Type E 504, Type F 506, Type G 508, Type H 510, Type I 512, and Type J 514 compare favorably to REF#2 516, thereby indicating an improvement associated with the inclusion of iron in the catalyst up to a threshold amount (e.g. Type I 512). Further to these embodiments, it is also observed that while catalyst Type I 512 compares favorably to catalyst Type G 508, catalyst Type G 508 may require a lower Iron loading level which may also require fewer impregnation steps.

Figure 6:
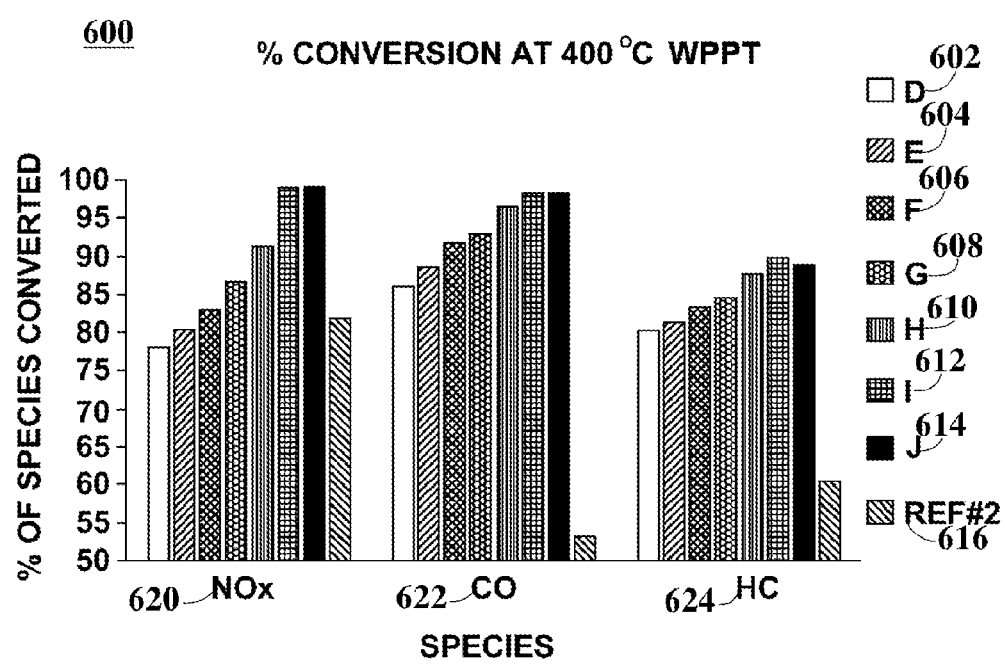
FIG. 6 is a graphical representation illustrating a comparison of WPPT percentage conversion values of NOx, CO, and HC for REF#2 and Type D, E, F, G, H, I, and J catalysts, according to an embodiment.

FIG. 6 is a graphical representation illustrating a comparison of emission percentage conversion values of NOx, CO, and HC for REF#2 (see Table 1) and Type D, E, F, G, H, I, and J (see Table 3) catalysts, according to an embodiment. In FIG. 6, Conversion Chart 600 illustrates the emission percentage conversion value for NOx 620, CO 622, and HC 624 associated with each catalyst for Type D 602, Type E 604, Type F 606, Type G 608, Type H 610, Type I 612, Type J 614, and REF#2 616 having undergone a WPPT at 400° C.

In these embodiments, it is observed that Type D 602 and Type E 604 compare unfavorably to REF#2 616 in the emission percentage conversion value of NOx 620 and favorably in the emission percentage conversion value of CO 622 and HC 624. Further to these embodiments, Type F 606, Type G 608, Type H 610, Type I 612, and Type J 614 compare favorably to REF#2 616 in the emission percentage conversion value of NOx 620, CO 622, and HC 624. Yet further to these embodiments, the comparison indicates a general improvement in catalytic performance associated with the inclusion of iron above a threshold amount (e.g. Type F 606) and reaching a plateau (e.g. Type I 612 and Type J 614) for the conversion of NOx 620 and CO 622.

Figure 7:
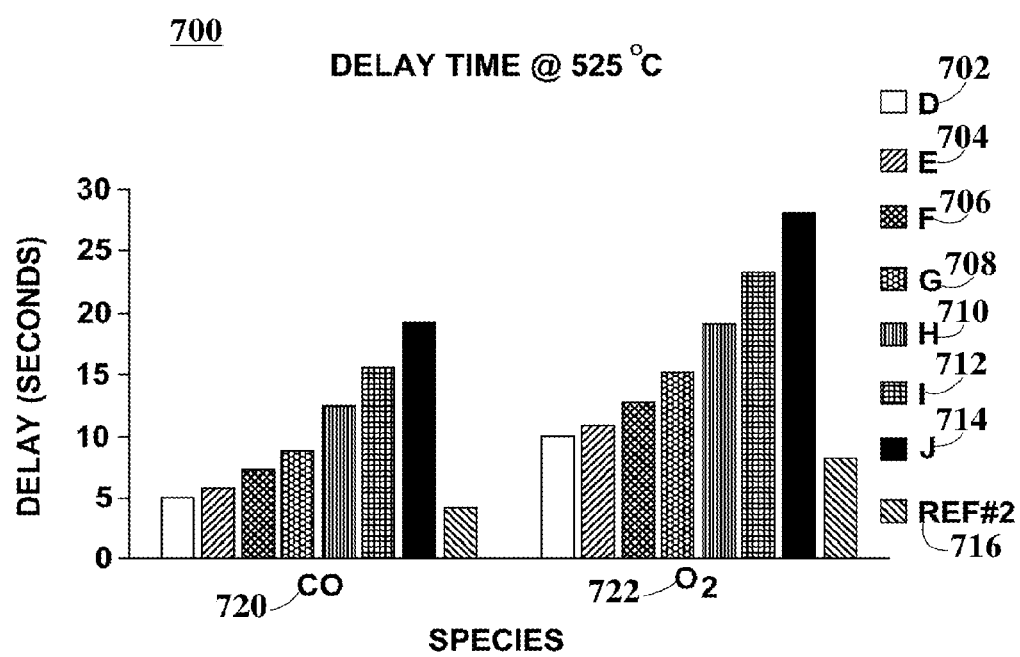
FIG. 7 is a graphical representation illustrating a comparison of oxygen storage capacity (OSC) values as CO and $O_2$ delay times for REF#2 and Type D, E, F, G, H, I, and J catalysts, according to an embodiment.

FIG. 7 is a graphical representation illustrating a comparison of oxygen storage capacity (OSC) for REF#2 (see Table 1) and Type D, E, F, G, H, I, and J (see Table 3) catalysts, according to an embodiment. In FIG. 7, Delay Time Chart 700 illustrates the delay time required to reach 50% of the CO 720 and O$_2$ 722 concentrations within the feed signal, associated with Type D 702, Type E 704, Type F 706, Type G 708, Type H 710, Type I 712, Type J 714, and REF#2 716 catalysts.

In these embodiments, an increasing trend in delay time is observed as the iron concentration increases from about 60 g/ft$^3$ for Type D 702 to about 630 g/ft$^3$ for Type J 714, indicating an increase in Oxygen Storage Capacity (OSC) as the concentration of iron is increased in Rhodium Iron catalysts. Further to these embodiments, it is observed that Type D 702, Type E 704, Type F 706, Type G 708, Type H 710, Type I 712, and Type J 714 compare favorably to REF#2 716, thereby indicating an improvement associated with the inclusion of iron in the catalyst. Further to these embodiments, it is also observed that while catalysts Type H 710, Type I 712, and Type J 714 compare favorably to catalysts Type D 702, Type E 704, Type F 706, and Type G 708, catalysts Type D 702, Type E 704, Type F 706, and Type G 708 may require a lower Iron loading level to match the OSC and On-board Diagnostics (OBD) requirements. Additionally, comparing the trend in OSC within Delay Time Chart 700 and the T50 value trend within T50 Chart 400, the OSC improvement and T50 performance improvement are observed to only have a partial relationship.

Figure 8:
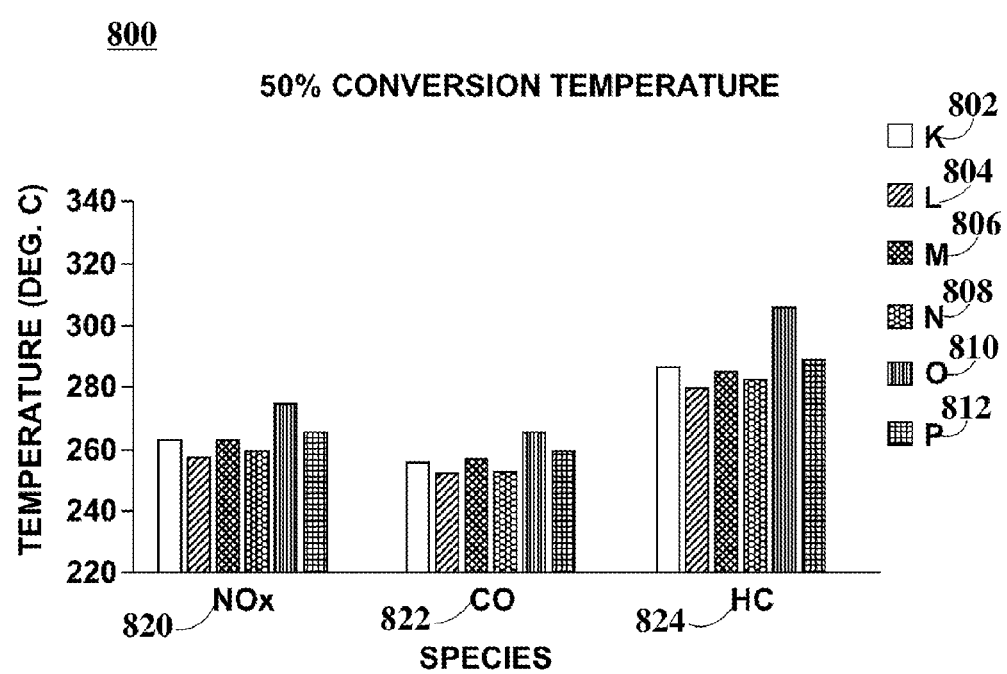
FIG. 8 is a graphical representation illustrating a comparison of T50 values of NOx, CO, and HC for Type K, L, M, N, O, and P catalysts, according to an embodiment.

FIG. 8 is a graphical representation illustrating a comparison of T50 values of NOx, CO, and HC for Type K, L, M, N, O, and P (see Table 4) catalysts, according to an embodiment. In FIG. 8, T50 Chart 800 illustrates the 50% conversion temperature value for NOx 820, CO 822, and HC 824 associated with each catalyst for Type K 802, Type L 804, Type M 806, Type N 808, Type O 810, and Type P 812.

In some embodiments, Type L 804 catalyst exhibits the lowest T50 temperature value and hence the best T50 performance. In these embodiments, Type N 808 catalyst exhibits a similar, though less favorable, T50 value when compared to Type L 804 catalyst. Further to these embodiments, Type K 802, Type M 806, and Type P 812 catalysts exhibit similar T50 performance, and Type O 810 exhibits the least favorable performance. Yet further to these embodiments, Type K 802, Type L 804, Type M 806, Type N 808, Type O 810, and Type P 812 catalysts exhibit a T50 value suitable for use in a catalyst system.

Figure 9:
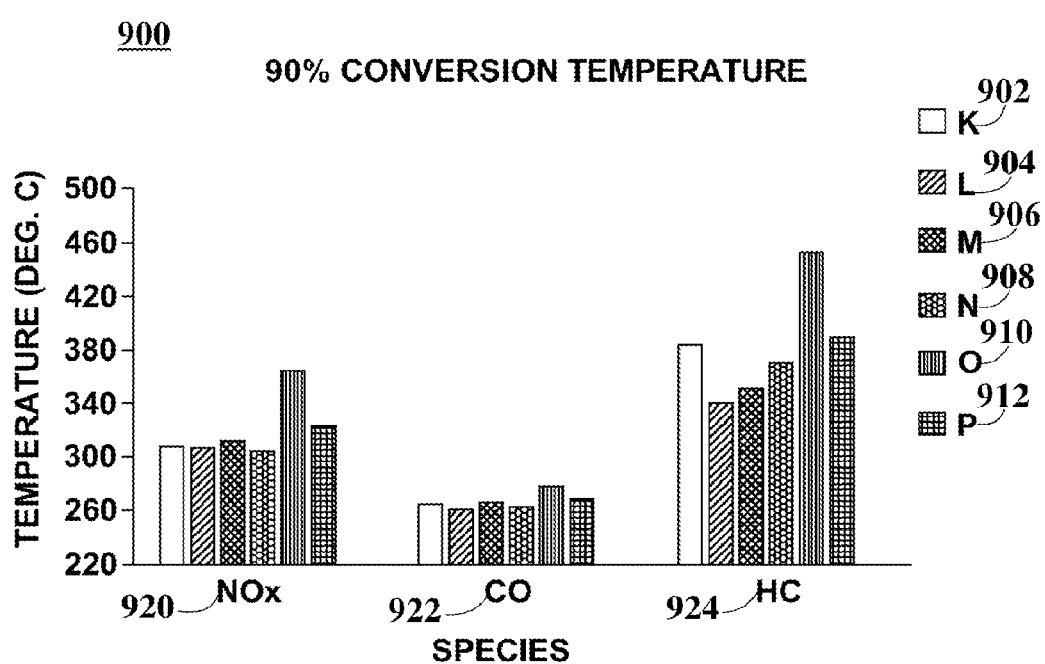
FIG. 9 is a graphical representation illustrating a comparison of T90 values of NOx, CO, and HC for Type K, L, M, N, O, and P catalysts, according to an embodiment.

FIG. 9 is a graphical representation illustrating a comparison of T90 values of NOx, CO, and HC for Type K, L, M, N, O, and P (see Table 4) catalysts, according to an embodiment. In FIG. 9, T90 Chart 900 illustrates the 90% conversion temperature value for NOx 920, CO 922, and HC 924 associated with each catalyst for Type K 902, Type L 904, Type M 906, Type N 908, Type O 910, and Type P 912.

In some embodiments, Type L 904 catalyst exhibits the lowest T90 temperature value and hence the best T90 performance. In these embodiments, Type K 902 catalyst exhibits a similar, though less favorable, T90 value when compared to Type L 904 catalyst, especially with regards to the T90 value associated with HC 924. Further to these embodiments, Type K 902, Type M 906, and Type P 912 catalysts exhibit increasing T90 performance, and Type O 910 exhibits the least favorable performance. Yet further to these embodiments, Type K 902, Type L 904, Type M 906, Type N 908, Type O 910 and Type P 912 catalysts exhibit a T90 value suitable for use in a catalyst system. Further to these embodiments, it is observed from T90 Chart 900 that lanthanum is associated with a lower catalytic performance with regards to conversion of HC 924.

Figure 10:
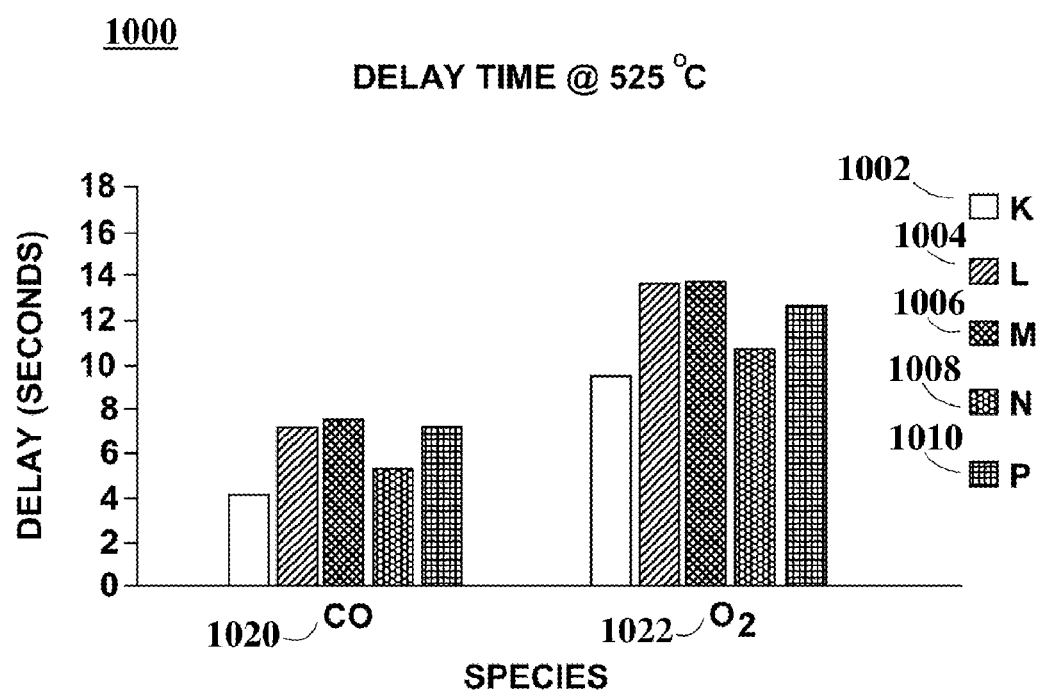
FIG. 10 is a graphical representation illustrating a comparison of oxygen storage capacity (OSC) values as CO and $O_2$ delay times for REF#2 and Type K, L, M, N, and P catalysts, according to an embodiment.

FIG. 10 is a graphical representation illustrating a comparison of oxygen storage capacity (OSC) for REF#2 and Type K, L, M, N, and P (see Table 4) catalysts, according to an embodiment. In FIG. 10, Delay Time Chart 1000 illustrates the delay time required to reach 50% of the CO 1020 and O$_2$ 1022 concentrations within the feed signal associated with Type K 1002, Type L 1004, Type M 1006, Type N 1008, and Type P 1010 catalysts.

In some embodiments, Type L 1004 and Type M 1006 catalysts exhibit the highest CO 1020 and O$_2$ 1022 delay times, and hence the best OSC. In these embodiments, Type P 1010 catalyst exhibits a similar, though less favorable, OSC when compared to Type L 1004 and Type M 1006 catalysts. Further to these embodiments Type K 1002 and Type N 1008 catalysts exhibit comparably lower delay times, suggesting the least favorable OSC. Yet further to these embodiments, Type K 1002, Type L 1004, Type M 1006, Type N 1008, and Type P 1010 catalysts exhibit an OSC suitable for use in a catalyst system. Further to these embodiments, it is observed from Delay Chart 1000 that lanthanum is associated with a lower CO and $O_2$ delay times.

Figure 11:
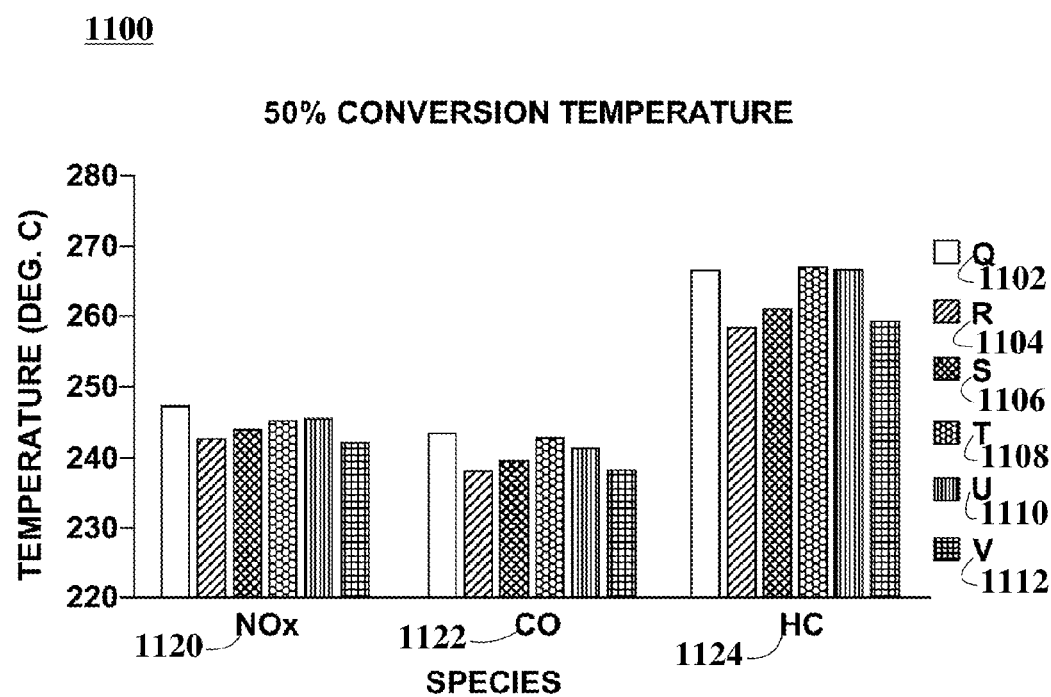
FIG. 11 is a graphical representation illustrating a comparison of T50 values of NOx, CO, and HC for Type Q, R, S, T, U, and V catalysts, according to an embodiment.

FIG. 11 is a graphical representation illustrating a comparison of T50 values of NOx, CO, and HC for Type Q, R, S, T, U, and V (see Table 5) catalysts, according to an embodiment. In FIG. 11, T50 Chart 1100 illustrates the 50% conversion temperature value for NOx 1120, CO 1122, and HC 1124 associated with each catalyst for Type Q 1102, Type R 1104, Type S 1106, Type T 1108, Type U 1110, and Type V 1112.

In some embodiments, a nonlinear relationship between the cerium loading and the 50% conversion temperature for NOx 1120, CO 1122, and HC 1124 is observed in catalysts Type Q 1102, Type R 1104, and Type S 1106. In these embodiments, the T50 value for NOx 1120, CO 1122, and HC 1124 for catalysts Type T 1108 and Type U 1110 are similar, indicating that catalysts excluding cerium may exhibit functional T50 values. Yet further to these embodiments, catalyst Type V 1112 including cerium and yttrium exhibit a generally more favorable performance when compared to catalyst Type Q 1102, where catalyst Type Q includes cerium only.

Figure 12:
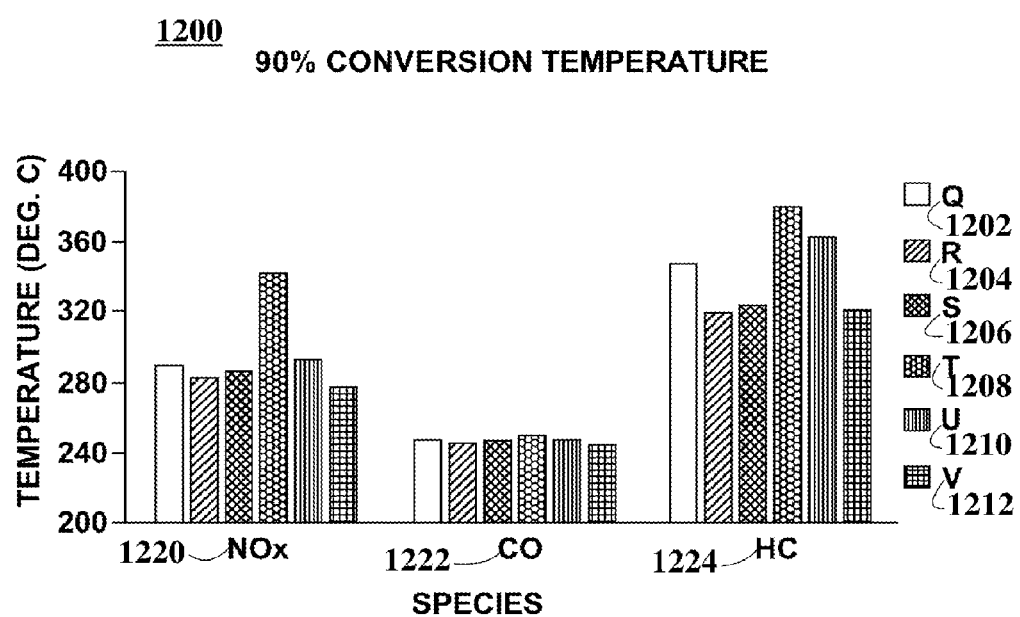
FIG. 12 is a graphical representation illustrating a comparison of T90 values of NOx, CO, and HC for Type Q, R, S, T, U, and V catalysts, according to an embodiment.

FIG. 12 is a graphical representation illustrating a comparison of T90 values of NOx, CO, and HC for Type Q, R, S, T, U, and V (see Table 5) catalysts, according to an embodiment. In FIG. 12, T90 Chart 1200 illustrates the 90% conversion temperature value for NOx 1220, CO 1222, and HC 1224 associated with each catalyst for Type Q 1202, Type R 1204, Type S 1206, Type T 1208, Type U 1210, and Type V 1212.

In some embodiments, a nonlinear and beneficial relationship between the cerium loading and the 90% conversion temperature for NOx 1220, CO 1122, and HC 1224 is observed in catalysts Type Q 1202, Type R 1204, and Type S 1206 when compared to catalysts Type T 1208 and Type U 1210. In these embodiments, the T90 value for HC 1224 observed for Type Q 1202 is significantly higher when compared to Type R 1204 and Type S 1206. In these embodiments, the T90 value for NOx 1220, CO 1222, and HC 1224 for catalysts Type T 1208 and Type U 1210 are dissimilar, as the T90 value for NOx 1220 and HC 1224 are significantly higher for Type T 1208 in comparison to Type U 1210. Further to these embodiments, the higher T90 value for NOx 1220 and HC 1224 associated with Type T 1208 can be a result of a lower OSC associated with catalyst Type T 1208. Further to these embodiments, the T90 value for CO 1222 and HC 1224 are slightly higher for Type T 1208 in comparison to Type U 1210, indicating that catalysts excluding cerium may exhibit functional T90 values for CO 1222 and HC 1224. Yet further to these embodiments, Type V 1212 catalyst including cerium and yttrium exhibits a generally more favorable performance when compared to Type Q 1202, Type R 1204, Type S 1206, Type T 1208, and Type U 1210 catalysts.

Figure 13:
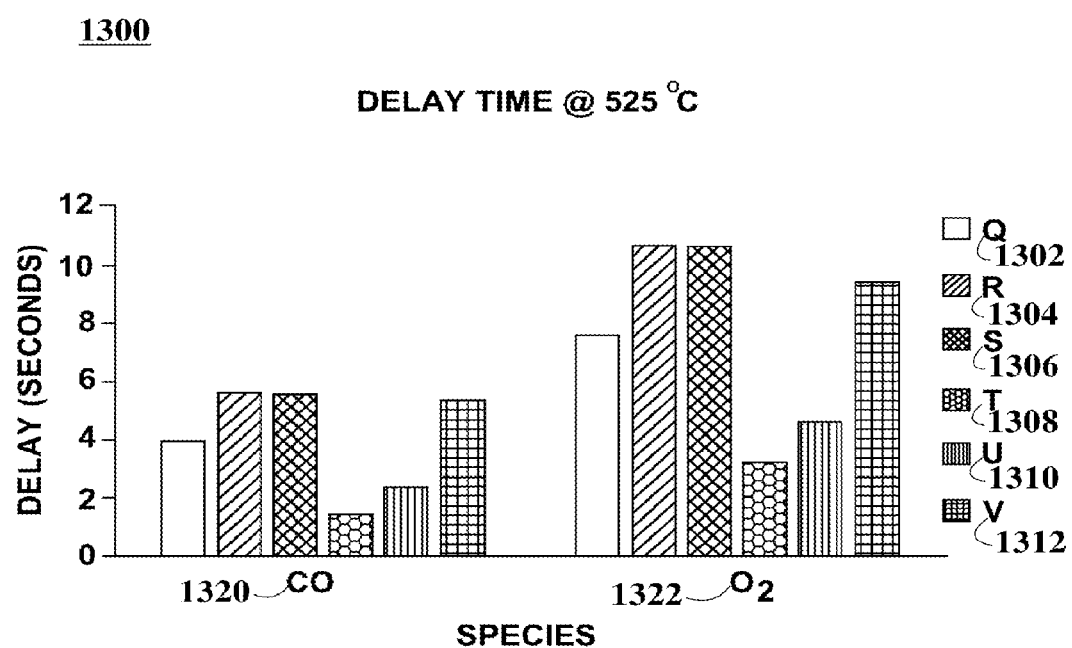
FIG. 13 is a graphical representation illustrating a comparison of oxygen storage capacity (OSC) values as CO and $O_2$ delay times for Type Q, R, S, T, U, and V catalysts, according to an embodiment.

FIG. 13 is a graphical representation illustrating a comparison of oxygen storage capacity (OSC) for Type Q, R, S, T, U, and V (see Table 5) catalysts, according to an embodiment. In FIG. 13, Delay Time Chart 1300 illustrates the delay time required to reach 50% of the CO 1320 and $O_2$ 1322 concentrations within the feed signal associated with Type Q 1302, Type R 1304, Type S 1306, Type T 1308, Type U 1310, and Type V 1312 catalysts.

In some embodiments, Type R 1304 and Type S 1306 catalysts exhibit the highest CO 1020 and $O_2$ 1022 delay times, and hence the best OSC. In these embodiments, Type Q 1302 catalyst exhibits a less favorable OSC when compared to Type R 1304 and Type S 1306 catalysts. Further to these embodiments Type T 1308 and Type U 1310 catalysts exhibit comparably low delay times suggesting the least favorable OSC. Yet further to these embodiments, Type V 1312 exhibits a similar, though less favorable, OSC when compared to Type R 1304 and Type S 1306. In these embodiments, the OSC is improved with the addition of Cerium in catalysts Type Q 1302, Type R 1304, Type S 1306, and Type V 1312 when compared to catalysts Type T 1308 and Type U 1310. Further to these embodiments, OSC improved with the addition of Yttrium, as is observed by comparing catalyst Type V 1312 to catalyst Type Q 1302 and comparing catalyst Type U 1310 to catalyst Type U 1310.

In these embodiments, Type Q 1302, Type R 1304, Type S 1306, Type T 1308, Type U 1310, and Type V 1312 catalysts exhibit an OSC suitable for use in a catalyst system.

Figure 14:
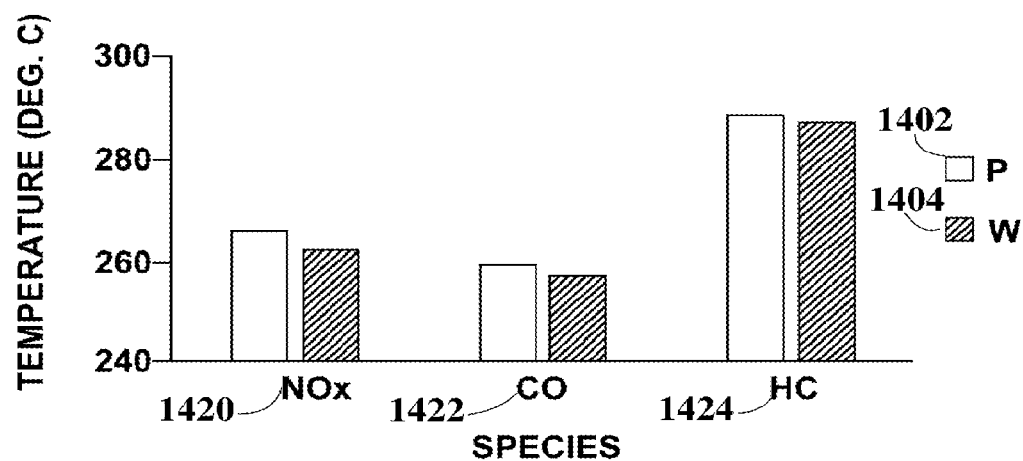
FIG. 14 is a graphical representation illustrating a comparison of T50 values of NOx, CO, and HC for Type P and Type W catalysts, according to an embodiment.

FIG. 14 is a graphical representation illustrating a comparison of T50 values of NOx, CO, and HC for Type P (See Table 4) and Type W (See Table 5) catalysts, according to an embodiment. In FIG. 14, T50 Chart 1400 illustrates the 50% conversion temperature value for NOx 1420, CO 1422, and HC 1424 associated with each catalyst for Type P 1402 and Type W 1404.

In some embodiments, Type W 1404 catalyst exhibits the lowest T50 temperature value and hence the best T50 performance. In these embodiments, Type P 1402 catalyst exhibits a similar, though less favorable, T50 value when compared to Type W 1404 catalyst. Yet further to these embodiments, Type P 1402 and Type W 1404 catalysts exhibit a T50 value suitable for use in a catalyst system.

Figure 15:
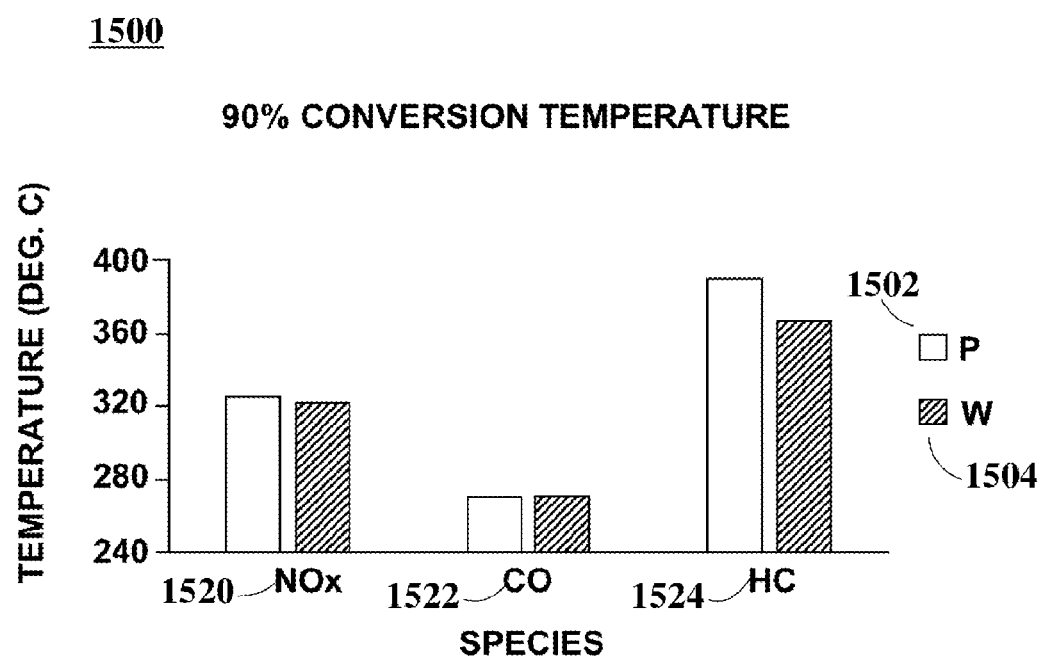
FIG. 15 is a graphical representation illustrating a comparison of T90 values of NOx, CO, and HC for Type P and Type W catalysts, according to an embodiment.

FIG. 15 is a graphical representation illustrating a comparison of T90 values of NOx, CO, and HC for Type P (See Table 4) and Type W (See Table 5) catalysts, according to an embodiment. In FIG. 14, T90 Chart 1500 illustrates the 90% conversion temperature for NOx 1520, CO 1522, and HC 1524 associated with each catalyst for Type P 1502 and Type W 1504.

In some embodiments, Type W 1504 catalyst generally exhibits the lowest T90 temperature value and hence the best T90 performance. In these embodiments, Type P 1502 catalyst generally exhibits a similar, though less favorable, T90 value when compared to Type W 1504 catalyst. Yet further to these embodiments, Type P 1502 and Type W 1504 catalysts exhibit a T90 value suitable for use in a catalyst system.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A catalyst system, comprising:
   a substrate;
   a washcoat deposited on the substrate;
   at least one impregnation layer; and
   an overcoat;
   wherein the washcoat comprises at least one of the group consisting of about 10 wt % to about 75 wt % cerium oxide, about 25 wt % to about 90 wt % zirconium-hafnium oxide, about 0 wt % to about 15 wt % lanthanum oxide, about 0 wt % to about 15 wt % neodymium oxide, about 0 wt % to about 15 wt % yttrium oxide, and about 0 wt % to about 15 wt % praseodymium oxide;

wherein the at least one impregnation layer comprises one or more of the group consisting of rhodium, iron nitrate, cerium, and combinations thereof; and wherein the overcoat comprises at least one of the group consisting of an oxygen storage material, a refractory support oxide, iron, rhodium, and combinations thereof.

2. The catalyst system of claim 1, wherein the washcoat further comprises at least one of the group consisting of a refractory support oxide, iron, rhodium, and combinations thereof.

3. The catalyst system of claim 1, wherein the at least one impregnation layer is loaded with about 2.9 g/ft$^3$ to about 9.8 g/ft$^3$ of rhodium.

4. The catalyst system of claim 3, wherein the at least one impregnation layer is loaded in the washcoat and wherein the washcoat further comprises a second impregnation layer of about 1 wt % to about 4 wt % iron.

5. The catalyst system of claim 3, wherein the at least one impregnation layer is loaded with about 60 g/ft$^3$ to about 630 g/ft$^3$ of iron.

6. The catalyst system of claim 5, wherein the at least one impregnation layer is loaded with about 150 g/ft$^3$ to about 630 g/ft$^3$ of iron.

7. The catalyst system of claim 3, wherein the washcoat comprises at least one of the group consisting of a fluorite phase Cerium Zirconium-Hafnium Lanthanum (CZL) OSM, a Cerium Zirconium-Hafnium Neodymium (CZN) OSM, a Cerium Zirconium-Hafnium Yttrium (CZY) OSM, a Cerium Zirconium-Hafnium Lanthanum Praseodymium (CZLP) OSM, a Cerium Zirconium (CZ) OSM, and a Cerium Zirconium-Hafnium Neodymium Yttrium (CZNY) OSM.

8. The catalyst system of claim 7, wherein said CZL OSM includes 30 wt % Cerium Oxide, 60 wt % Zirconium-Hafnium Oxide, and 10 wt % Lanthanum Oxide; said CZN OSM includes 30 wt % Cerium Oxide, 60 wt % Zirconium-Hafnium Oxide, and 10 wt % Neodymium Oxide; said CZY OSM includes 30 wt % Cerium Oxide, 60 wt % Zirconium-Hafnium Oxide, and 10 wt % Yttrium Oxide; said CZLP OSM includes 30 wt % Cerium Oxide, 60 wt % Zirconium-Hafnium Oxide, 5 wt % Lanthanum Oxide, and 5 wt % Praseodymium Oxide; said CZ OSM includes 75 wt % Cerium Oxide and 30% Zirconium-Hafnium Oxide; and said CZNY OSM includes 31 wt % Cerium, 58.3 wt % Zirconium-Hafnium, 5.5 wt % Neodymium, and 5.2 wt % Yttrium Oxide.

9. The catalyst system of claim 3, wherein the washcoat comprises at least one of the group consisting of a CZL, a CZN, a CZY, a CZLP, and a CZNY.

10. The catalyst system of claim 9, wherein said CZL OSM includes 30 wt % Cerium Oxide, 60 wt % Zirconium-Hafnium Oxide, and 10 wt % Lanthanum Oxide; said CZN OSM includes 30 wt % Cerium Oxide, wt % Zirconium-Hafnium Oxide, and 10 wt % Neodymium Oxide; said CZY OSM includes 30 wt % Cerium Oxide, 60 wt % Zirconium-Hafnium Oxide, and 10 wt % Yttrium Oxide; said CZLP OSM includes 30 wt % Cerium Oxide, 60 wt % Zirconium-Hafnium Oxide, 5 wt % Lanthanum Oxide, and 5 wt % Praseodymium Oxide; and said CZNY OSM includes 31 wt % Cerium, 58.3 wt % Zirconium-Hafnium, 5.5 wt % Neodymium, and 5.2 wt % Yttrium Oxide.

11. The catalyst system of claim 3, wherein the at least one impregnation layer is further loaded with about 150 g/ft$^3$ to about 630 g/ft$^3$ of iron; about 499 g/ft$^3$ to about 1497 g/ft$^3$ Cerium; and 0 g/ft$^3$ to about 317 g/ft$^3$ yttrium.

12. The catalyst system of claim 3, wherein the at least one impregnation layer is further loaded with about 150 g/ft$^3$ to about 630 g/ft$^3$ of iron; 0 g/ft$^3$ to about 1497 g/ft$^3$ Cerium; and about 31.7 g/ft$^3$ to about 317 g/ft$^3$ yttrium.

13. The catalyst system of claim 3, wherein the washcoat comprises about 7.36 wt % iron.

14. The catalyst system of claim 1, wherein the at least one impregnation layer is loaded with about 60 g/ft$^3$ to about 630 g/ft$^3$ of iron.

15. The catalyst system of claim 1, wherein the at least one impregnation layer is loaded with about 499 g/ft$^3$ to about 1497 g/ft$^3$ of cerium.

16. The catalyst system of claim 1, wherein the washcoat comprises iron, rhodium, and CZNY OSM.

17. The catalyst system of claim 16, wherein the washcoat comprises 7.36 wt % iron, rhodium, and CZNY OSM, and wherein the CZNY OSM comprises 31 wt % Cerium, 58.3 wt % Zirconium-Hafnium, 5.5 wt % Neodymium, and 5.2 wt % Yttrium Oxide.

18. The catalyst system of claim 1, wherein the washcoat comprises about 4 wt % to about 20 wt % iron.

19. The catalyst system of claim 1, wherein rhodium is loaded in the washcoat at about 0.1 g/ft$^3$ to about 20 g/ft$^3$.

20. The catalyst system of claim 19, wherein rhodium is loaded in the washcoat at about 4.8 g/ft$^3$.

* * * * *